United States Patent
Takahashi et al.

(10) Patent No.: US 10,880,597 B2
(45) Date of Patent: Dec. 29, 2020

(54) TRANSMISSION DEVICE, TRANSMISSION METHOD, RECEPTION DEVICE, AND RECEPTION METHOD

(71) Applicant: Saturn Licensing LLC, New York, NY (US)

(72) Inventors: Kazuyuki Takahashi, Chiba (JP); Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/523,723

(22) PCT Filed: Nov. 9, 2015

(86) PCT No.: PCT/JP2015/081524
§ 371 (c)(1),
(2) Date: May 2, 2017

(87) PCT Pub. No.: WO2016/084592
PCT Pub. Date: Jun. 2, 2016

(65) Prior Publication Data
US 2018/0310049 A1 Oct. 25, 2018

(30) Foreign Application Priority Data
Nov. 28, 2014 (JP) .................................. 2014-241953

(51) Int. Cl.
*H04N 21/439* (2011.01)
*H04N 21/236* (2011.01)
(Continued)

(52) U.S. Cl.
CPC ......... *H04N 21/439* (2013.01); *G10L 19/008* (2013.01); *H04N 21/21805* (2013.01);
(Continued)

(58) Field of Classification Search
CPC combination set(s) only.
See application file for complete search history.

(56) References Cited

U.S. PATENT DOCUMENTS 5,714,997 A * 2/1998 Anderson ............ G02B 27/017
348/39
5,823,786 A * 10/1998 Easterbrook ....... A63B 24/0003
434/247
(Continued)

FOREIGN PATENT DOCUMENTS

CN 102859584 A 1/2013
CN 103460283 A 12/2013
(Continued)

OTHER PUBLICATIONS

"Information technology—Coding of audio-visual objects—Part1: Systems," ISO/IEC 14496-1, Fourth Edition, 2010, 159 pages.
(Continued)

*Primary Examiner* — An Son P Huynh
(74) *Attorney, Agent, or Firm* — Oblon, McClelland, Maier & Neustadt, L.L.P.

(57) ABSTRACT

A first video stream having video data of a first view, a second video stream having video data of a second view, and an audio stream having audio data of an object sound source and positional information based on the first view of the object sound source are generated. A container of a predetermined format including the first video stream, the second video stream, the audio stream, and position correction information for correcting the positional information of the object sound source to positional information based on the second view is transmitted. Thereby, it is possible to accurately perform 3D audio rendering even in a case that view switching is performed at a reception side.

20 Claims, 26 Drawing Sheets

(51) Int. Cl.
*H04S 5/02* (2006.01)
*G10L 19/008* (2013.01)
*H04N 21/218* (2011.01)
*H04N 21/2365* (2011.01)
*H04N 21/2368* (2011.01)
*H04R 1/32* (2006.01)

(52) U.S. Cl.
CPC ....... *H04N 21/236* (2013.01); *H04N 21/2365* (2013.01); *H04N 21/2368* (2013.01); *H04R 1/326* (2013.01); *H04S 5/02* (2013.01)

(56) References Cited

U.S. PATENT DOCUMENTS

| | | | | |
|---|---|---|---|---|
| 5,835,667 | A * | 11/1998 | Wactlar | G11B 27/034 386/241 |
| 5,923,869 | A * | 7/1999 | Kashiwagi | G11B 20/10 713/501 |
| 5,995,941 | A * | 11/1999 | Maquire | G06Q 30/02 235/52 |
| 6,144,375 | A * | 11/2000 | Jain | G11B 27/105 715/251 |
| 6,229,550 | B1 * | 5/2001 | Gloudemans | H04N 5/272 345/641 |
| 6,353,461 | B1 * | 3/2002 | Shore | G11B 27/034 348/239 |
| 6,466,275 | B1 * | 10/2002 | Honey | H04N 5/222 348/157 |
| 6,537,076 | B2 * | 3/2003 | McNitt | A63B 24/0003 434/247 |
| 6,750,919 | B1 * | 6/2004 | Rosser | H04N 5/272 348/584 |
| 6,813,435 | B1 * | 11/2004 | Lee | G11B 27/005 375/E7.004 |
| 6,825,875 | B1 * | 11/2004 | Strub | G11B 27/031 348/158 |
| 6,961,954 | B1 * | 11/2005 | Maybury | G11B 27/28 725/53 |
| 7,184,959 | B2 * | 2/2007 | Gibbon | G06F 16/7834 704/270 |
| 8,370,358 | B2 * | 2/2013 | Lin | G06F 16/29 707/737 |
| 9,094,615 | B2 * | 7/2015 | Aman | G01S 3/7864 |
| 9,579,586 | B2 * | 2/2017 | Bear | H04N 5/445 |
| 9,704,393 | B2 * | 7/2017 | Acharya | H04N 7/18 |
| 2001/0005218 | A1 * | 6/2001 | Gloudemans | H04N 5/272 348/157 |
| 2002/0016971 | A1 * | 2/2002 | Berezowski | G08B 13/19693 725/105 |
| 2002/0115047 | A1 * | 8/2002 | McNitt | A63B 24/0003 434/252 |
| 2002/0170068 | A1 * | 11/2002 | Rafey | H04N 5/4401 725/112 |
| 2002/0188943 | A1 * | 12/2002 | Freeman | G03C 1/26 725/38 |
| 2003/0033318 | A1 * | 2/2003 | Carlbom | G06F 16/784 |
| 2003/0033602 | A1 * | 2/2003 | Gibbs | G11B 27/28 725/46 |
| 2004/0261127 | A1 * | 12/2004 | Freeman | G03C 1/26 725/135 |
| 2005/0179701 | A1 | 8/2005 | Jahnke | |
| 2006/0239471 | A1 * | 10/2006 | Mao | H04R 1/406 381/92 |
| 2007/0025555 | A1 * | 2/2007 | Gonai | H04R 5/04 381/17 |
| 2008/0013746 | A1 * | 1/2008 | Reichelt | H04S 3/008 381/63 |
| 2009/0034456 | A1 * | 2/2009 | Peng | H04B 1/715 370/329 |
| 2009/0034556 | A1 * | 2/2009 | Song | H04L 69/22 370/471 |
| 2009/0252379 | A1 | 10/2009 | Kondo et al. | |
| 2010/0014693 | A1 * | 1/2010 | Park | G06Q 30/0601 381/119 |
| 2011/0052155 | A1 * | 3/2011 | Desmarais | H04N 5/76 386/290 |
| 2011/0164769 | A1 | 7/2011 | Zhan et al. | |
| 2011/0193933 | A1 * | 8/2011 | Ryu | H04N 7/142 348/14.08 |
| 2011/0311207 | A1 | 12/2011 | Urabe et al. | |
| 2013/0039632 | A1 * | 2/2013 | Feinson | H04N 5/77 386/223 |
| 2013/0129304 | A1 * | 5/2013 | Feinson | H04N 13/167 386/223 |
| 2013/0307934 | A1 * | 11/2013 | Densham | G01S 3/802 348/46 |
| 2013/0336628 | A1 * | 12/2013 | Lamb | H04N 9/79 386/224 |
| 2014/0079257 | A1 * | 3/2014 | Ruwe | F21V 21/084 381/309 |
| 2015/0245133 | A1 * | 8/2015 | Kim | H04R 1/326 381/92 |
| 2016/0080684 | A1 * | 3/2016 | Farrell | H04N 9/8211 386/227 |
| 2016/0094875 | A1 * | 3/2016 | Peterson | H04N 21/44016 725/41 |

FOREIGN PATENT DOCUMENTS

| | | |
|---|---|---|
| CN | 103635964 A | 3/2014 |
| CN | 103843330 A | 6/2014 |
| JP | 2005-229618 A | 8/2005 |
| JP | 2007-324676 | 12/2007 |
| JP | 2012-4835 A | 1/2012 |
| JP | 2014-520491 A | 8/2014 |
| WO | 2015/162947 A1 | 10/2015 |

OTHER PUBLICATIONS

International Search Report dated Jan. 19, 2016 in PCT/JP2015/081524 filed Nov. 9, 2015.
Extended European Search Report dated May 22, 2018 in corresponding European Patent Application No. 15862526.9, 7 pages.
Office Action dated Sep. 10, 2019 in Japanese Patent Application No. 2016-561483.

\* cited by examiner

FIG. 5

$$r' = \sqrt{(x-x_1)^2 + (y-y_1)^2 + (z-z_1)^2}$$

$$\theta' = \cos^{-1}\left(\frac{(z-z_1)}{r'}\right) - \Delta\theta = \cos^{-1}\left(\frac{(z-z_1)}{\sqrt{(x-x_1)^2+(y-y_1)^2+(z-z_1)^2}}\right) - \Delta\theta$$

$$\phi' = \tan^{-1}\frac{(y-y_1)^2}{(x-x_1)} - \Delta\phi$$

| Syntax | No. of bits | Mnemonic |
|---|---|---|
| object_metadata() { | | |
|   if (lowDelayMetadataCoding==0) { | | |
|     object_metadata_efficient() | | |
|   } else { | | |
|     object_metadata_low_delay() | | |
|   } | | |
| } | | |

(b)

| Syntax | No. of bits | Mnemonic |
|---|---|---|
| object_metadata_efficient() { | | |
|   intracoded_object_metadata_efficient(); | | |
|   has_differential_metadata; | 1 | bslbf |
|   if (has_differential_metadata) { | | |
|     differential_object_metadata(); | | |
|   } | | |
| } | | |

FIG. 9

| Syntax | No of Bits | Mnemonic | Remarks |
|---|---|---|---|
| POSITION CORRECTION INFORMATION (multiview_Position_information1)() { | | | |
| process_multiview ; | 1 | bslbf | FLAG INDICATING MULTIVIEW |
| reserved | 7 | bslbf | |
| if (process_multivew) { | | | |
| multiview_count ; | 8 | uimsbf | TOTAL NUMBER OF VIEWS |
| for (i=0; i < multiview_count-1; i++) { | | | |
| Δx ; | 8 | tcimsbf | x-COORDINATE OF View (View1 IS ORIGIN) |
| Δy ; | 8 | tcimsbf | y-COORDINATE OF View (View1 IS ORIGIN) |
| Δz ; | 8 | tcimsbf | z-COORDINATE OF View (View1 IS ORIGIN) |
| Δθ ; | 9 | tcimsbf | DIFFERENCE OF θ WITH RESPECT TO View1 |
| Δφ ; | 7 | tcimsbf | DIFFERENCE OF φ WITH RESPECT TO View1 |
| } | | | |
| } | | | |
| } | | | |

| Syntax | No. of Bits | Format |
|---|---|---|
| userdataConfig (){ | | |
|     userdata_identifier | 32 | uimsbf |
|     userdata_frame_length | 16 | uimsbf |
| } | | |

(b)

| Syntax | No. of Bits | Format |
|---|---|---|
| user_data(){<br>    user_data_start_code<br>    user_data_identifier<br>    user_structure()<br>} | <br>32<br>32 | <br>bslbf<br>bslbf |

(c)

| Syntax | No. of Bits | Format |
|---|---|---|
| ATSC_user_data(){<br>    user_data_type_code<br>    user_data_type_structure()<br>} | <br>8 | <br>uimsbf |

FIG. 11

| Syntax | No of Bits | Mnemonic | Remarks |
|---|---|---|---|
| component_group_descriptor() { | | | |
|   descriptor_tag | 8 | uimsbf | |
|   descriptor_length | 8 | uimsbf | |
|   component_group_type | 4 | uimsbf | |
|   num_video | 4 | uimsbf | NUMBER OF VIDEOS ES |
|   for (i=0; i< num_video; i++) { | | | |
|     component_tag | 8 | uimsbf | TAG VALUE OF RELATED VIDEO COMPONENT |
|   } | | | |
|   num_audio | 8 | uimsbf | NUMBER OF AUDIOS ES |
|   for (i=0; i< num_audio; i++) { | | | |
|     component_tag | 8 | uimsbf | TAG VALUE OF RELATED AUDIO COMPONENT |
|   } | | | |
| } | | | |

FIG. 13

| Video_sequence(){ | No. of bits | Mnemonic |
|---|---|---|
| next_start_code() | | |
| sequence_header() | | |
| if( nexbits() == extension_start_code){ | | |
| sequence_extension() | | |
| do { | | |
| extension_and_user_data(0) | | |
| do { | | |
| if( nexbits() == group_start_code){ | | |
| group_of_pictures_header() | | |
| extension_and_user_data(1) | | |
| } | | |
| picture_header() | | |
| picture_coding_extension() | | |
| extension_and_user_data(2) | | |
| picture_data() | | |
| } while((nextbits() == picture_start_code \|\| | | |
| (nextbits() == group_start_code)) | | |
| if( nexbits() != sequence_end_code) { | | |
| sequence_header() | | |
| sequence_extension() | | |
| } | | |
| } while (nextbits() != sequence_end_code) | | |
| } else { | | |
| /*ISO/IEC 11172-2*/ | | |
| } | | |
| sequence_end_code | 32 | bslbf |
| } | | |

| Value | No. of Bits | Format |
|---|---|---|
| extension_and_user_data(2) {<br>    while ((nextbits() == extension_start_code ) \|\|<br>    (nextbits() == user_data_start_code)) {<br>      if (nextbits() == extension_start_code)<br>        extension_data(2)<br>      if (nextbits() == user_data_start_code)<br>        user_data()<br>    }<br>} | | |

(b)

| Syntax | No. of Bits | Format |
|---|---|---|
| user_data() { | | |
|     user_data_start_code | 32 | bslbf |
|     user_data_identifier | 32 | bslbf |
|     user_structure() | | |
| } | | |

(c)

| Syntax | No. of Bits | Format |
|---|---|---|
| ATSC_user_data() { | | |
|     user_data_type_code | 8 | uimsbf |
|     user_data_type_structure() | | |
| } | | |

FIG. 15

| Syntax | No of Bits | Mnemonic | Remarks |
|---|---|---|---|
| POSITION CORRECTION INFORMATION (multiview_Position_information2)() { | | | |
| process_multiview ; | 1 | bslbf | FLAG INDICATING MULTIVIEW |
| reserved | 7 | bslbf | |
| if (process_multivew) { | | | |
| Δx ; | 8 | tcimsbf | x-COORDINATE OF View (View1 IS ORIGIN) |
| Δy ; | 8 | tcimsbf | y-COORDINATE OF View (View1 IS ORIGIN) |
| Δz ; | 8 | tcimsbf | z-COORDINATE OF View (View1 IS ORIGIN) |
| Δθ ; | 9 | tcimsbf | DIFFERENCE OF θ WITH RESPECT TO View1 |
| Δφ ; | 7 | tcimsbf | DIFFERENCE OF φ WITH RESPECT TO View1 |
| } | | | |
| } | | | |

| Syntax | No. of Bits | Format |
|---|---|---|
| User_data_registered_itu_t_t35() { | | |
|     itu_t_t35_country_code | 8 | bslbf |
|     itu_t_t35_provider_code | 16 | bslbf |
|     USER_identifier | 32 | bslbf |
|     USER_structure() | | |
| } | | |

(b)

| Syntax | No. of Bits | Format |
|---|---|---|
| ATSC1_data() { | | |
|     user_data_type_code | 8 | uimsbf |
|     user_data_type_structure() | var | |
|     marker_bits | 8 | '11111111' |
| } | | |

FIG. 18

| Syntax | No of Bits | Mnemonic | Remarks |
|---|---|---|---|
| POSITION CORRECTION INFORMATION DESCRIPTOR multiview_Position_information_descriptor () { | | | |
| descriptor_tag | 8 | uimsbf | |
| descriptor_length | 8 | uimsbf | |
| PTS_flag | 1 | bslbf | INDICATING TIME INFORMATION (PTS) CORRESPONDING TO ACQUIRED POSITION INFORMATION. |
| reserved | 7 | bslbf | |
| if (PTS_flag == '1') { | | | |
| reserved | 4 | uimsbf | |
| PTS [32..30] | 3 | bslbf | |
| marker | 1 | bslbf | |
| PTS[29..15] | 15 | bslbf | |
| marker | 1 | bslbf | |
| PTS [14..0] | 15 | bslbf | |
| marker | 1 | bslbf | |
| } | | | |
| Δx ; | 8 | tcimsbf | x-COORDINATE OF View (View1 IS ORIGIN) |
| Δy ; | 8 | tcimsbf | y-COORDINATE OF View (View1 IS ORIGIN) |
| Δz ; | 8 | tcimsbf | z-COORDINATE OF View (View1 IS ORIGIN) |
| Δθ ; | 9 | tcimsbf | DIFFERENCE OF θ WITH RESPECT TO View1 |
| Δφ ; | 7 | tcimsbf | DIFFERENCE OF φ WITH RESPECT TO View1 |
| } | | | |
| } | | | |

FIG. 21

| Syntax | No of Bits | Mnemonic | Remarks |
|---|---|---|---|
| POSITION CORRECTION INFORMATION STREAM ES | | | |
| multiview_Position_information_PES_data () { | | | |
|   data_identifier | 8 | uimsbf | VALUE INDICATING PES data OF POSITION CORRECTION INFORMATION |
|   private_stream_id | 8 | uimsbf | UNUSED (0xFF) |
|   reserved_future_use | 4 | bslbf | UNUSED (0x0F) |
|   PES_data_packet_header_length | 4 | uimsbf | LENGTH OF PES_Data_private_data_byte |
|   for (i=0; i<N1; i++) { | | | |
|     PES_Data_private_data_byte | 8 | bslbf | SERVICE-DEPENDENT PRIVATE DATA |
|   } | | | |
|   Δx ; | 8 | tcimsbf | x-COORDINATE OF View (View1 IS ORIGIN) |
|   Δy ; | 8 | tcimsbf | y-COORDINATE OF View (View1 IS ORIGIN) |
|   Δz ; | 8 | tcimsbf | z-COORDINATE OF View (View1 IS ORIGIN) |
|   Δθ ; | 9 | tcimsbf | DIFFERENCE OF θ WITH RESPECT TO View1 |
|   Δφ ; | 7 | tcimsbf | DIFFERENCE OF φ WITH RESPECT TO View1 |
| } | | | |

FIG. 23

| | | TRANSMISSION SYSTEM FOR POSITION CORRECTION INFORMATION | CHARACTERISTICS |
|---|---|---|---|
| AUDIO LAYER | ① | 3d audio METADATA | - AUDIO COLLECTION POSITION INFORMATION AND POSITION CORRECTION INFORMATION ARE ADDED TO AUDIO SIGNALS.<br>- INFORMATION MAY BE TRANSMITTED TO POSITION CORRECTION OPERATION CIRCUIT ONLY FROM AUDIO SIGNALS.<br>- SINCE INFORMATION IS INCLUDED IN SAME AUDIO SIGNALS, SYNCHRONIZATION OF THESE SIGNALS CAN BE GUARANTEED. |
| | ② | USER DATA | |
| VIDEO LAYER | ③ | USER DATA (MPEG-2)... | - CORRESPONDING POSITION CORRECTION INFORMATION IS ADDED TO EACH VIDEO SIGNAL.<br>- INFORMATION NECESSARY FOR EACH VIDEO IS TRANSMITTED, WHICH PREVENTS TRANSMISSION OF EXTRA INFORMATION (AMOUNT OF TRANSMISSION TO BE TRANSMITTED IS SMALL)<br>- IN A CASE WHERE VIDEO IS SELECTED IN RE-TRANSMISSION, POSITION CORRECTION INFORMATION IS DIRECTLY TRANSMITTED, WHICH ELIMINATES EXTRA PROCESSING. |
| | ③' | USER DATA (AVC/HEVC)... | |
| CONTAINER (SYSTEM) LAYER | ④ | SIGNALING | - TRANSMISSION AS DESCRIPTOR ENABLES DISCRIMINATION OF INFORMATION NECESSARY IN SYSTEM LAYER. |
| | ⑤ | POSITION CORRECTION INFORMATION STREAM | - POSITION CORRECTION INFORMATION AS WELL AS TIME LINE IS TRANSMITTED AS INDEPENDENT STREAM CORRESPONDING TO VIDEO SIGNAL.<br>- IN A CASE WHERE VIDEO IS SELECTED IN RE-TRANSMISSION, CORRESPONDING POSITION CORRECTION INFORMATION CAN BE SELECTED AND TRANSMITTED. |

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and more particularly, to a transmission device and the like that transmit an audio stream having audio data and positional information of an object sound source together with a video stream.

BACKGROUND ART

Heretofore, as a three-dimensional (3D) audio technique, a 3D audio rendering technique for mapping audio data of an object sound source to a speaker present at any position on the basis of positional information of the object sound source has been proposed (for example, see Patent Document 1).

CITATION LIST

Patent Document

Patent Document 1: JP-T-2014-520491

SUMMARY OF THE INVENTION

Problems to be Solved by the Invention

The above-mentioned positional information of the object sound source is based on a single view. In a case where content is photographed from a plurality of views, the position or orientation of a camera to be used varies from camera to camera. Accordingly, in a case where switching of views is performed at a reception side, 3D audio rendering can be accurately performed only in the view used as a reference.

An object of the present technology is to enable accurate 3D audio rendering even in a case where switching of views is performed at a reception side.

Solutions to Problems

A concept of the present technology lies in a transmission device including:

an encode unit configured to generate a first video stream having video data of a first view, a second video stream having video data of a second view, and an audio stream having audio data of an object sound source and positional information based on the first view of the object sound source; and a transmission unit configured to transmit a container of a predetermined format including the first video stream, the second video stream, the audio stream, and position correction information for correcting the positional information of the object sound source to positional information based on the second view.

In the present technology, the encode unit generates the first video stream having the video data of the first view, the second video stream having the video data of the second view, and the audio stream. The audio stream has the audio data of the object sound source and positional information based on the first view of the object sound source.

The transmission unit transmits the container of the predetermined format including the first video stream, the second video stream, the audio stream, and the position correction information for correcting the positional information of the object sound source to the positional information based on the second view. For example, the position correction information may indicate difference components of positions and orientations of the first view and the second view. For example, the container may be a transport stream (MPEG-2 TS) which is adopted in digital broadcasting standards. Further, the container may be, for example, a container of MP4 used for delivery or the like on the Internet, or a container of a format other than MP4.

For example, the position correction information may be inserted into a layer of the audio stream. In this case, the synchronization of the audio data and positional information of the object sound source with the position correction is guaranteed. In this case, for example, the position correction information may be inserted into a metadata region including the positional information. Further, in this case, for example, the position correction information may be inserted into a user data region.

Further, in this case, for example, when a plurality of the second views is present, a plurality of pieces of position correction information respectively corresponding to the plurality of second views may be inserted into a layer of the audio stream, and information indicating second video streams respectively corresponding to the plurality of pieces of position correction information may be inserted into a layer of the container.

Further, for example, the position correction information may be inserted into a layer of the second video stream. In this case, association between the position correction information and the second video stream is facilitated. In this case, for example, the position correction information may be inserted into the user data region.

Further, for example, the position correction information may be inserted into the layer of the container. In this case, for example, the position correction information may be inserted as signaling information. In this case, at a reception side, the position correction information can be obtained in a layer of a system.

In this case, the container may be MPEG2-TS, and the position correction information may be inserted into a video elementary stream loop corresponding to the second video stream of a program map table.

Further, in this case, an information stream including the position correction information may be inserted. In this case, at the reception side, the position correction information can be easily acquired from the information stream independent of the audio stream and the video stream.

Thus, in the present technology, the position correction information for correcting positional information of the object sound source to the positional information based on the second view is transmitted together with the first video stream, the second video stream, and the audio stream. Accordingly, in a case where the view is switched to the second view at the reception side, the positional information of the object sound source that is corrected by the position correction information in such a way that the positional information is based on the second view can be used, and thus 3D audio rendering can be accurately performed.

Further, another concept of the present technology lies in a reception device including:

a reception unit configured to receive a container of a predetermined format including a first video stream having video data of a first view, a second video stream having video data of a second view, an audio stream having audio data of an object sound source and positional information based on the first view of the object sound source, and position correction information for correcting the positional information of the object sound source to positional information based on the second view; and a processing unit configured to process information included in the container.

In the present technology, the reception unit receives the container of the predetermined format including the first video stream having the video data of the first view, the second video stream having the video data of the second view, the audio stream having the audio data of the object sound source and positional information based on the first view of the object sound source, and the position correction information for correcting the positional information of the object sound source to the positional information based on the second view. Further, the processing unit processes information included in the container.

For example, the processing unit may include: a decode unit configured to obtain the video data of the first view, the video data of the second view, the audio data and positional information of the object sound source from the first video stream, the second video stream, and the audio stream, respectively; a selector configured to selectively output the video data of the first view or the video data of the second view; and a rendering unit configured to map the audio data of the object sound source to any speaker position on the basis of the positional information of the object sound source. The rendering unit may use the positional information corrected on the basis of the position correction information in such a way that the positional information is based on the second view, when the video data of the second view is selected by the selector.

Thus, in the present technology, for example, when the video data of the second view is selected, rendering is performed using the positional information corrected on the basis of the position correction information in such a way that the positional information is based on the second view. Accordingly, even in a case where view switching is performed, 3D audio rendering can be accurately performed.

Further, another concept of the present technology lies in a reception device including:

a reception unit configured to receive a container of a predetermined format including a first video stream having video data of a first view, a second video stream having video data of a second view, and an audio stream having audio data of an object sound source and positional information based on the first view of the object sound source;

an acquisition unit configured to acquire position correction information for correcting the positional information of the object sound source to positional information based on the second view;

a decode unit configured to obtain the video data of the first view, the video data of the second view, the audio data and positional information of the object sound source from the first video stream, the second video stream, and the audio stream, respectively;

a selector configured to selectively output the video data of the first view or the video data of the second view; and a rendering unit configured to map the audio data of the object sound source to any speaker position on the basis of the positional information of the object sound source, in which the rendering unit uses the positional information corrected on the basis of the position correction information in such a way that the positional information is based on the second view, when the video data of the second view is selected by the selector.

In the present technology, the reception unit receives the container of the predetermined format including the first video stream having the video data of the first view, the second video stream having the video data of the second view, and the audio stream having the audio data of the object sound source and positional information based on the first view of the object sound source.

The acquisition unit acquires the position correction information for correcting the positional information of the object sound source to the positional information based on the second view. For example, the acquisition unit may acquire the position correction information from a layer of the audio stream, a layer of the second video stream, or a layer of the container. Further, for example, the acquisition unit may acquire the position correction information from a server on a network.

The decode unit obtains the video data of the first view, the video data of the second view, and the audio data and positional information of the object sound source from the first video stream, the second video stream, and the audio stream, respectively. The selector selectively outputs the video data of the first view or the video data of the second view.

The rendering unit maps the audio data of the object sound source to any speaker position on the basis of the positional information of the object sound source. This rendering unit uses the positional information corrected on the basis of the position correction information in such a way that the positional information is based on the second view, when the video data of the second view is selected by the selector.

Thus, in the present technology, when the video data of the second view is selected, rendering is performed using the positional information corrected on the basis of the position correction information in such a way that the positional information is based on the second view. Accordingly, even in a case where view switching is performed, 3D audio rendering can be accurately performed.

Effects of the Invention

According to the present technology, 3D audio rendering can be accurately performed even in a case where view switching is performed at a reception side. Note that advantageous effects described herein are illustrated by way of example only and not limited, and additional advantageous effects may be provided.

BRIEF DESCRIPTION OF DRAWINGS

FIG. 5 is a diagram illustrating an example of a transformation for correcting (transforming) positional information s (r, θ, ϕ) on the object sound source.

FIGS. 8(a) and 8(b) are diagrams each illustrating a configuration example and the like of object metadata (object_metadata( )).

FIG. 9 is a diagram illustrating a configuration example (Syntax) of multiview position information 1 (multiview_Position_information1( )).

FIGS. 10(a) to 10(c) are diagrams each illustrating a configuration example of configuration information "userdataConfig( )".

FIG. 11 is a diagram illustrating a structure example of a component group descriptor (component_group_descriptor).

FIG. 13 is a diagram illustrating a configuration example of a video sequence (Video_sequence).

FIGS. 14(a) to 14(c) are diagrams each illustrating a configuration example and the like of user data.

FIG. 15 is a diagram illustrating a configuration example of multiview position information 2 (multiview_Position_information2( )).

FIGS. 16(a) and 16(b) are diagrams each illustrating a configuration example and the like of user data SEI in MPEG4-AVC and HEVC.

FIG. 18 is a diagram illustrating a configuration example of a multiview position information descriptor.

FIG. 21 is a diagram illustrating a configuration example of a position correction information stream (elementary stream).

FIG. 23 is a list of transmission systems for position correction information.

MODE FOR CARRYING OUT THE INVENTION

Modes for carrying out the invention (hereinafter referred to as "embodiments") will be described below. Note that the description is given in the following order.

1. Embodiments
2. Modified examples

1. Embodiments

Configuration Example of Transmission/Reception System

Figure 1:
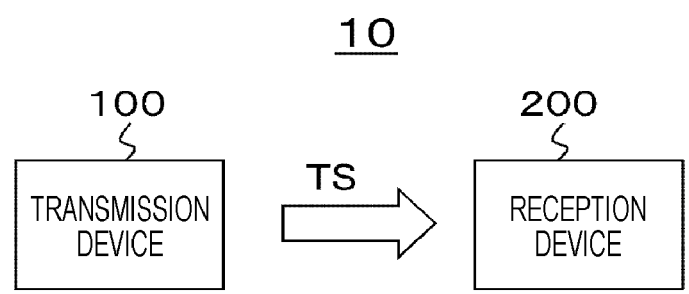
FIG. 1 is a block diagram illustrating a configuration example of a transmission/reception system as an embodiment.

FIG. 1 illustrates a configuration example of a transmission/reception system 10 as an embodiment. The transmission/reception system 10 is composed of a transmission device 100 and a reception device 200. The transmission device 100 transmits a transport stream TS that is carried on a broadcast wave or packets on a network.

Figure 2:
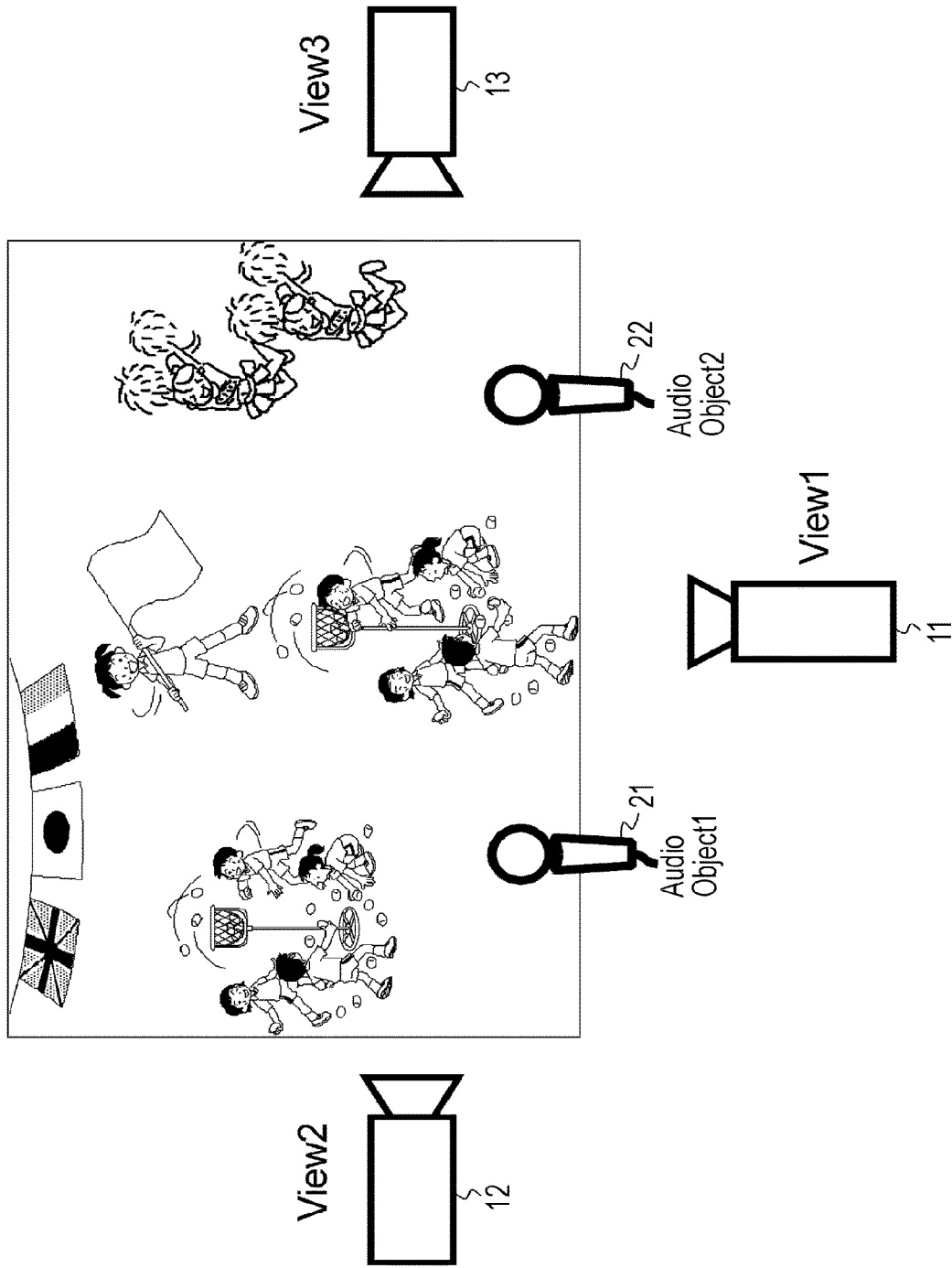
FIG. 2 is a diagram illustrating an example of an assumed status of view (video) photographing by a camera and audio collection by a microphone.

This transport stream TS includes a plurality of video streams respectively having video data of a plurality of views, and an audio stream having audio data and positional information of one or more object sound sources. FIG. 2 illustrates an example of an assumed status of view (video) photographing by a camera and audio collection by a microphone. Assume in this embodiment that the transport stream TS includes the video streams and audio stream corresponding to this assumed status.

Specifically, the transport stream TS includes a video stream having video data SV1 on a view 1 (View1) obtained by photographing the view by a camera 11, a video stream having video data SV2 on a view 2 (View2) obtained by photographing the view by a camera 12, and a video stream having video data SV3 on a view 3 (View3) obtained by photographing the view by a camera 13.

Further, the transport stream TS includes one audio stream. This audio stream includes audio data obtained by a microphone 21 (audio data of an object sound source 1 (Object1)), and positional information based on the view 1 of the microphone 21 (positional information of the object sound source 1). Further, this audio stream includes audio data obtained by a microphone 22 (audio data of an object sound source 2 (Object2)), and positional information based on the view 1 of the microphone 22 (positional information of the object sound source 2).

Further, this transport stream TS includes difference components of positions and orientations of the view 1 and the view 2. The difference components constitute position correction information for correcting positional information of each object sound source to positional information based on the view 2. Further, the transport stream TS includes difference components of positions and orientations of the view 1 and the view 3. The difference components constitute position correction information for correcting positional information of each object sound source to positional information based on the view 3. The difference components are inserted into a layer of the audio stream, a layer of the video stream of the view 2 or view 3 constituting the second view, or a layer of a container.

The reception device 200 receives the transport stream TS that is transmitted from the transmission device 100 and carried on a broadcast wave or packets on a network. As described above, this transport stream TS includes three video streams including video data of the view 1, video data of the view 2, and video data of the view 3, respectively, and one audio stream having the audio data and positional information of the object sound source 1 and the object sound source 2.

Further, this transport stream TS includes difference components of positions and orientations of the view 1 and view 2 as position correct information for correcting the positional information of each object sound source to positional information based on the view 2. Further, this transport stream TS includes difference components of positions and orientations of the view 1 and view 3 as position correction information for correcting the positional information of each object sound source to positional information based on the view 3.

The reception device 200 selectively presents images corresponding to the video data of the view 1, the view 2, and the view 3. Further, the reception device 200 performs rendering for mapping the audio data of the object sound source to any speaker position on the basis of the positional information of the object sound source, and reproduces the audio data. In this case, in a case where the view 2 and the view 3 are selected, the positional information corrected by the difference components is used, thereby making it possible to accurately perform rendering.

Specifically, when the view 2 is selected, the positional information corrected on the basis of the difference components of the positions and orientations of the view 1 and the view 2 in such a way that the positional information is based on the second view is used. Further, when the view 3 is selected, the positional information corrected on the basis of the difference components of the positions and orientations of the view 1 and view 3 in such a way that the positional information is based on the third view is used.

Figure 3:
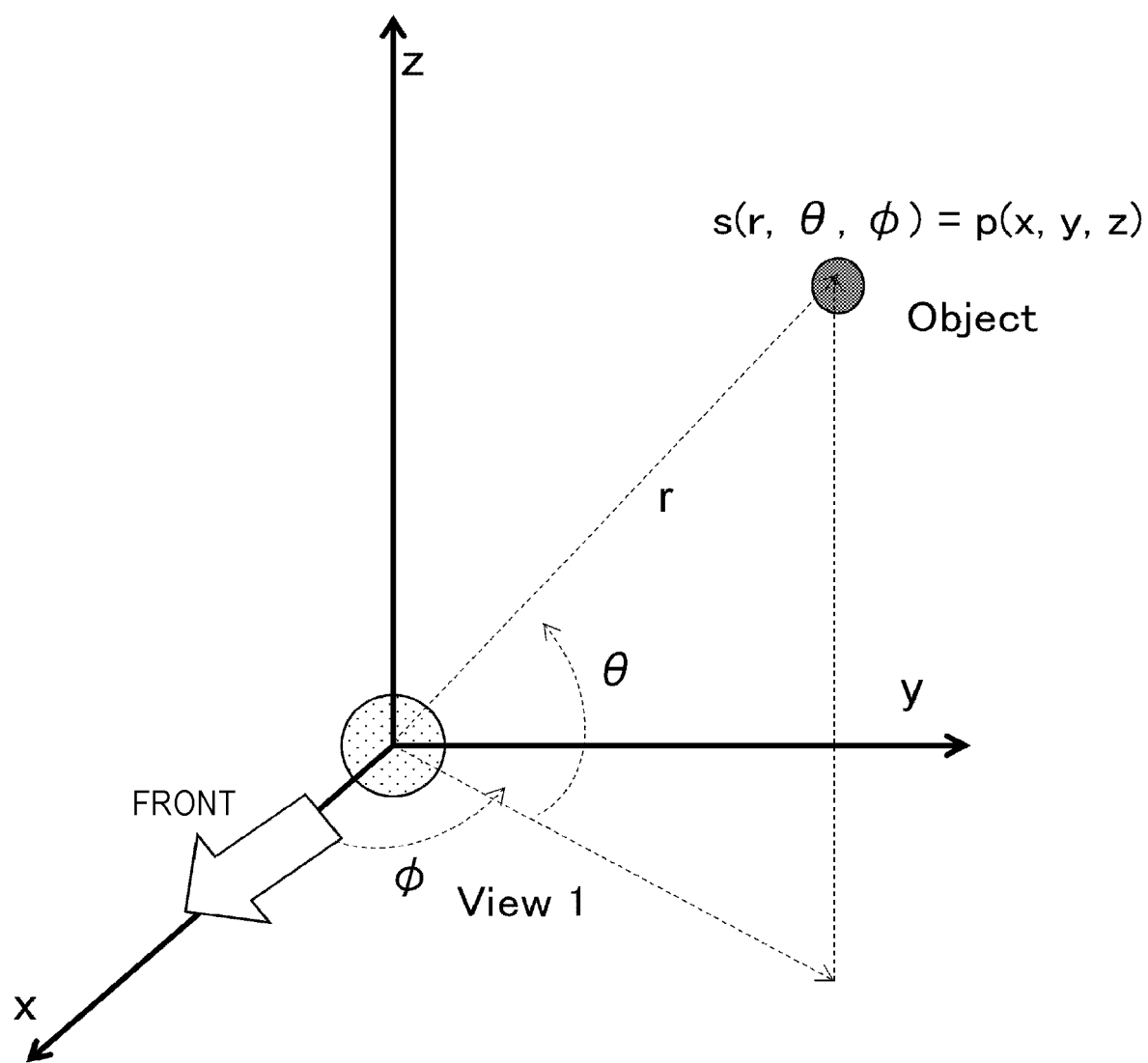
FIG. 3 is a diagram illustrating a positional relationship between a view 1 (View1) and an object sound source.

FIG. 3 illustrates a positional relationship between the view 1 (View1) and the object sound source. The position of the object sound source can be represented by polar coordinates s $(r, \theta, \phi)$ on the basis of the view 1, and can also be represented by orthogonal coordinates p $(x, y, z)$. In this case, "r" represents a radius; "$\theta$" represents an elevation; and "$\phi$" represents an azimuth.

As described above, the transmission device 100 transmits an audio stream including the audio data and positional information of the object sound source. This audio stream includes metadata of a 3D audio. As the metadata, coordinate values of the polar coordinate s $(r, \theta, \phi)$ of the object sound source, and gain values are inserted.

Figure 4:
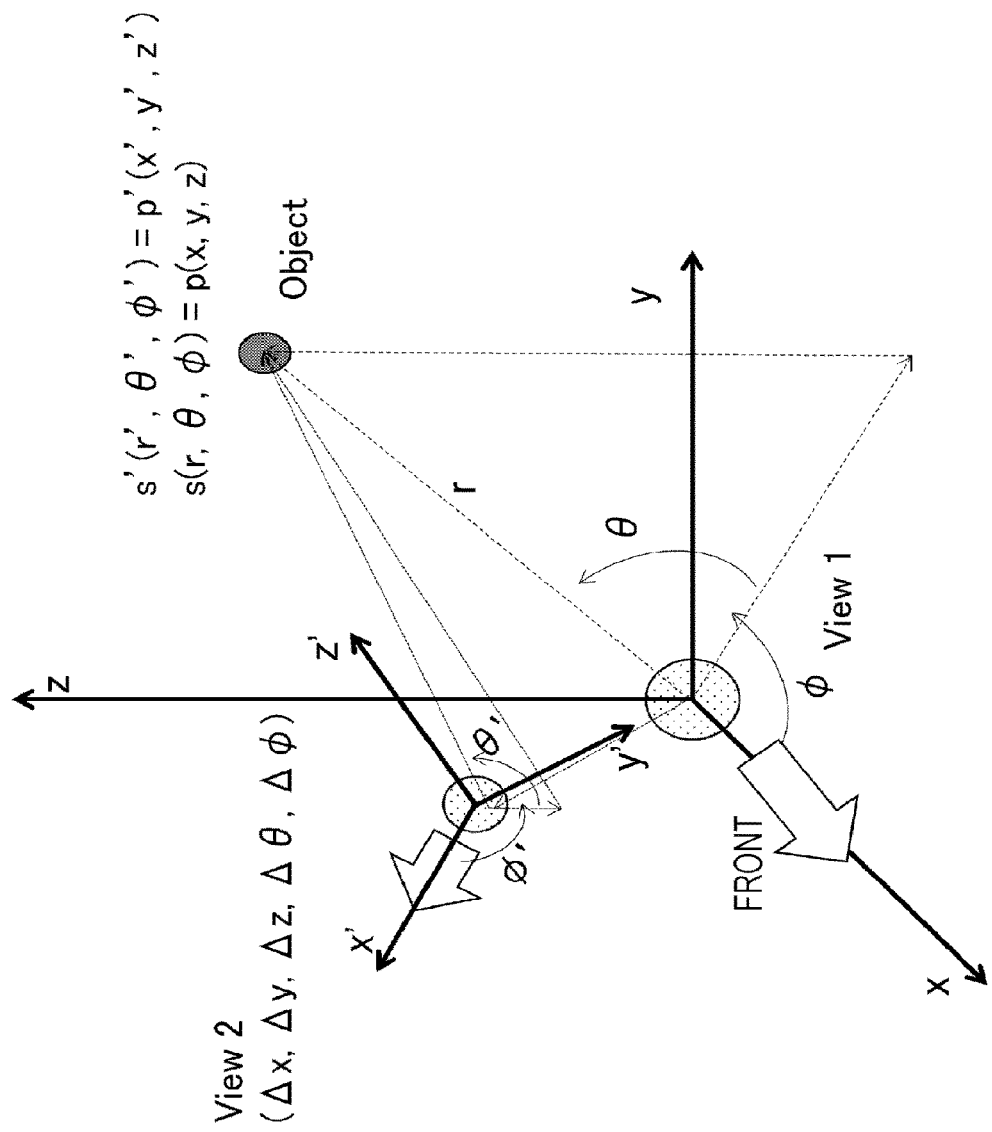
FIG. 4 is a diagram illustrating a positional relationship between a view 2 (View2) and the object sound source.

FIG. 4 illustrates a positional relationship between the view 2 (View2) and the object sound source. The position of the object sound source can be represented by polar coordinates s'$(r', \theta', \phi')$ on the basis of the view 2, and can also be represented by orthogonal coordinates p'$(x', y', z')$. In this case, the difference components of the positions and orientations of the view 1 and view 2 include difference components $(\Delta x, \Delta y, \Delta z)$ of spatial positions and difference components $(\Delta \theta, \Delta \phi)$ of orientations.

The reception device 200 can correct (transform) the positional information s $(r, \theta, \phi)$ on the object sound source to the positional information s'$(r', \theta', \phi')$ based on the view 2 by using these difference components. FIG. 5 illustrates an example of a transformation in this case. Note that in this transformation, (x, y, z) corresponds to the coordinate values of the orthogonal coordinates p $(x, y, z)$ of the object sound source, and (x1, y1, z1) corresponds to difference components $(\Delta x, \Delta y, \Delta z)$.

Note that although detailed descriptions are omitted, the positional relationship between the view 3 and the object sound source is similar to the positional relationship described above.

Configuration Example of Transmission Device

Figure 6:
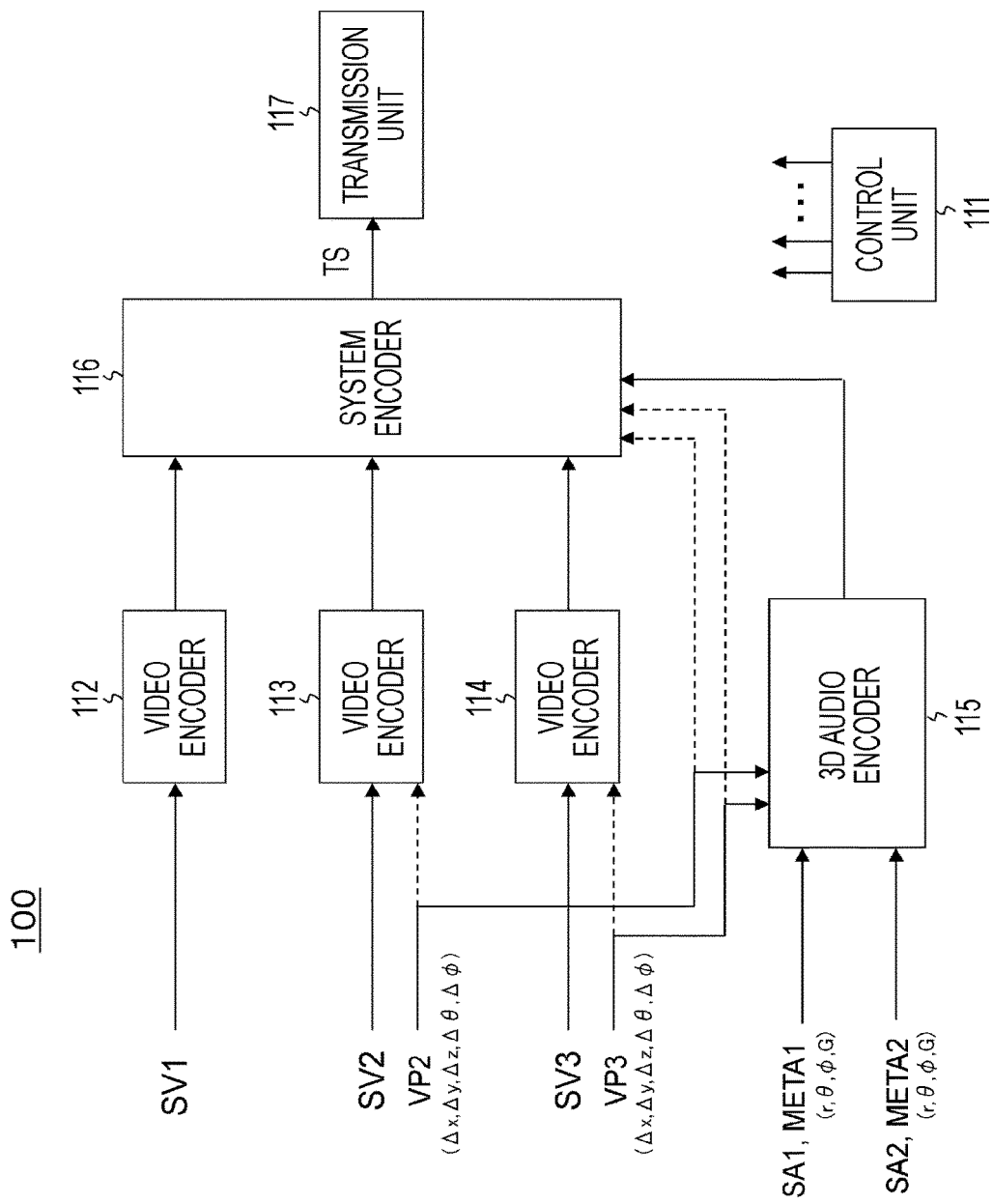
FIG. 6 is a block diagram illustrating a configuration example of a transmission device.

FIG. 6 illustrates a configuration example of the transmission device 100. This transmission device 100 includes a control unit 111, video encoders 112, 113, and 114, a 3D audio encoder 115, a system encoder 116, and a transmission unit 117. The control unit 111 controls the operation of each part of the transmission device 100.

The video encoders 112, 113, and 114 receive the video data SV1 on the view 1, the video data SV2 on the view 2, and the video data SV3 on the view 3, respectively, and perform encoding, such as MPEG2, MPEG4-AVC, or HEVC, on the video data SV1, SV2, and SV3, to thereby obtain video streams. The 3D audio encoder 115 receives object data of the object sound sources 1 and 2, and performs encoding such as MPEG-H 3D Audio on the object data, to thereby obtain an audio stream.

In this case, the object data of the object sound source 1 is composed of object audio data SA1 and object metadata META1. This object metadata META1 includes the coordinate values of the polar coordinates s $(r, \theta, \phi)$ of the object sound source 1 and a gain value. Further, the object data of the object sound source 2 is composed of object audio data SA2 and object metadata META2. This object metadata META2 includes the coordinate values of the polar coordinates s $(r, \theta, \phi)$ of the object sound source 2 and a gain value.

The system encoder 116 packetizes the video streams output from the video encoders 112, 113, and 114, respectively, and the audio stream output from the 3D audio encoder 115 into PES packets, and further transforms the packets into transport packets and multiplexes the packets, to thereby obtain the transport stream TS as a multiplexed stream. The transmission unit 117 transmits the transport stream TS carried on a broadcast wave or packets on a network to the reception device 200.

In this embodiment, in the transmission device 100, difference components VP2 $(\Delta x, \Delta y, \Delta z, \Delta \theta, \Delta \phi)$ of the positions and orientations of the view 1 and view 2 and difference components VP3 $(\Delta x, \Delta y, \Delta z, \Delta \theta, \Delta \phi)$ of the positions and orientations of the view 1 and view 3 are inserted into (1) a layer of an audio stream, (2) a layer of a video stream, or (3) a layer of a container. In this case, the difference components VP2 constitute position correction information for correcting the positional information of the object sound sources 1 and 2 to the positional information based on the view 2. Further, the difference components VP3 constitute position correction information for correcting the positional information of the object sound sources 1 and 2 to the positional information based on the view 3.

"(1) A Case where Difference Components are Inserted into a Layer of an Audio Stream"

A case where the difference components VP2 and VP3 are inserted into a layer of an audio stream will be described. In this case, the 3D audio encoder 115 inserts the difference components VP2 and VP3 into the layer of the audio stream as the position correction information. In this case, the difference components are inserted into a metadata region or a user data region.

Figure 7:
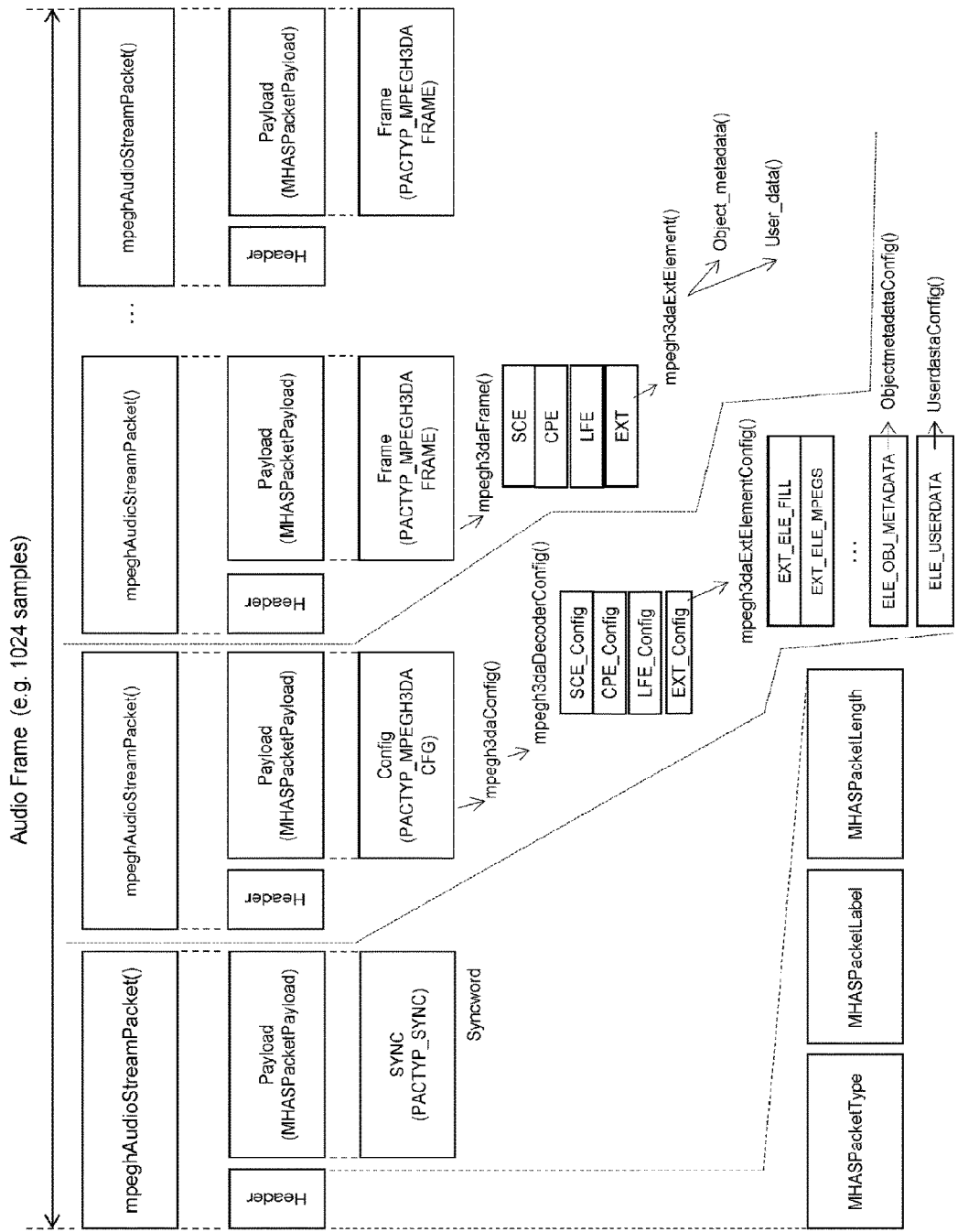
FIG. 7 is a diagram for explaining a structure of an audio frame of MPEG-H 3D Audio.

FIG. 7 illustrates a structure of an audio frame of MPEG-H 3D Audio. This audio frame is composed of a plurality of MPEG audio stream packets. Each MPEG audio stream packet is composed of a header and a payload.

The header has information such as a packet type, a packet label, and a packet length. Information defined by the packet type of the header is arranged in the payload. In this payload information, "SYNC" corresponding to a synchronization start code, "Frame" representing actual data, and "Config" indicating the configuration of the "Frame" are present.

The object data of the object sound source is composed of the object audio data and the object metadata as described above. These pieces of data are included in the "Frame". In this case, the object audio data is included as encoded sample data of a single channel element (SCE). Further, the object metadata is included as an extension element (Ext_element). The extension element (Ext_element) including user data can also be defined.

In a case where the difference components VP2 and VP3 are inserted into the metadata region, the difference components VP2 and VP3 are inserted into the extension element (Ext_element) including the object metadata.

FIG. 8(a) illustrates a structure example (Syntax) of the object metadata (object_metadata( )). FIG. 8(b) illustrates a configuration example (Syntax) of object metadata efficient (object_metadata_efficient( )) included in the object metadata. In intracoded metadata efficient (intracoded_object_metadata_efficient( )) of the object metadata efficient, multiview position information 1 (multiview_Position_information1( )) having the difference components VP2 and VP3 is arranged.

FIG. 9 illustrates a configuration example (Syntax) of the multiview position information 1 (multiview_Position_information1( )). A 1-bit field of "process_multiview" is a flag indicating a multiview. In the case of the multiview, an 8-bit field of "multiview_count" is present. This field indicates the total number of views. In the example shown in FIG. 2, the total number of views is "3".

Further, a number of fields of difference components of views corresponding to "total number−1", i.e., a number of fields of difference components of views other than the view 1 (View1) are present. In the example shown in FIG. 2, the fields of the difference components VP2 and VP3 of the view 2 (View2) and the view 3 (View3) are present. The fields of the difference components are composed of an 8-bit field of "Δx", an 8-bit field of "Δy", an 8-bit field of "Δz", a 9-bit field of "Δθ", and a 7-bit field of "Δϕ".

The field of "Δx" indicates Δx, i.e., the value of the X-coordinate of a target view centered on the view 1 (View1) as an origin. The field of "Δy" indicates Δy, i.e., the value of the y-coordinate of a target view centered on the view 1 (View1) as an origin. The field of "Δz" indicates Δz, i.e., the value of the z-coordinate of a target view centered on the view 1 (View1) as an origin. The field of "Δθ" indicates Δθ, i.e., a difference of θ with respect to the view 1 (View1). The field of "Δϕ" indicates Δϕ, i.e., a difference ϕ with respect to the view 1 (View1).

In a case where the difference components VP2 and VP3 are inserted into the user data region, the difference components VP2 and VP3 are inserted into the extension element (Ext_element) including the user data.

In this case, an element (Ext_userdata) including user data (user_data( )) as the extension element (Ext_element) is newly defined. Along with this, configuration information "userdataConfig( )" on the element (Ext_userdata) is newly defined as "Config".

FIG. 10(a) illustrates a configuration example (Syntax) of configuration information "userdataConfig( )". A 32-bit field of "userdata_identifier" indicates user data by setting values in a preliminarily defined sequence. A 16-bit field of "userdata_frame_length" indicates the number of bytes of the user data (user_data( )).

FIG. 10(b) illustrates a configuration example (Syntax) of user data (user_data( ) ). By inserting "0x47413934" ("GA94") into the 32-bit field of "user_data_identifier", "ATSC_user_data( )" is included in the field of "user_structure( )". FIG. 10(c) illustrates a configuration example (Syntax) of "ATSC_user_data( )".

By inserting, for example, "0x07" indicating the multiview position information 1 (multiview_Position_information1( )) into an 8-bit field of "user data_type_code", multiview position information 1 (multiview_Position_information1( )) (see FIG. 9) is included in the field of "user_data_type_structure( )".

Note that in a case where the difference components VP2 and VP3 are inserted into the layer of the audio stream as described above, the system encoder 116 inserts information indicating video streams respectively corresponding to a plurality of difference components into the layer of the container (system). For example, the system encoder 116 inserts the difference components into the audio elementary stream loop corresponding to the audio stream by using the component group descriptor (component_group_descriptor).

FIG. 11 illustrates a configuration example (Syntax) of the component group descriptor. An 8-bit field of "descriptor_tag" indicates a descriptor type. In this case, the 8-bit field indicates the component group descriptor. An 8-bit field of "descriptor_length" indicates the length (size) of the descriptor, and the length of the descriptor is indicated by the number of subsequent bytes.

A 4-bit field of "component_group_type" indicates the type of the component group. In this case, the 4-bit field is set to "0" which indicates a video/audio component group related to 3D audio multiple views. A 4-bit field of "num_video" indicates the number of video streams (video elementary streams). Further, the 8-bit field of "component_tag" is repeated in a for loop by the number times corresponding to the number of video streams. This field of "component_tag" indicates the value of a component tag (Component_tag) of a relevant video component.

In this embodiment, the values of component tags of video streams including the video data of the view 1 (View1), the video data of the view 2 (View2), and the video data of the view 3 (View3) are sequentially described. Incidentally, in the video elementary stream loop corresponding to each video stream, pieces of information, such as a packet identifier (PID), the component tag (Component_tag), and a stream type (Stream_Type), are arranged. With this configuration, the video streams including the video data of the view 2 (View2) and the video data of the view 3 (View3) are specified. Accordingly, video streams respectively corresponding to the difference components VP2 and VP3 to be inserted into the layer of the audio stream are specified.

An 8-bit field of "num_audio" indicates the number of audio streams (audio elementary streams). Further, the 8-bit field of "component_tag" is repeated in a for loop by the number of times corresponding to the number of audio streams. This field of "component_tag" indicates the value of the component tag (Component_tag) of a relevant audio component.

Figure 12:
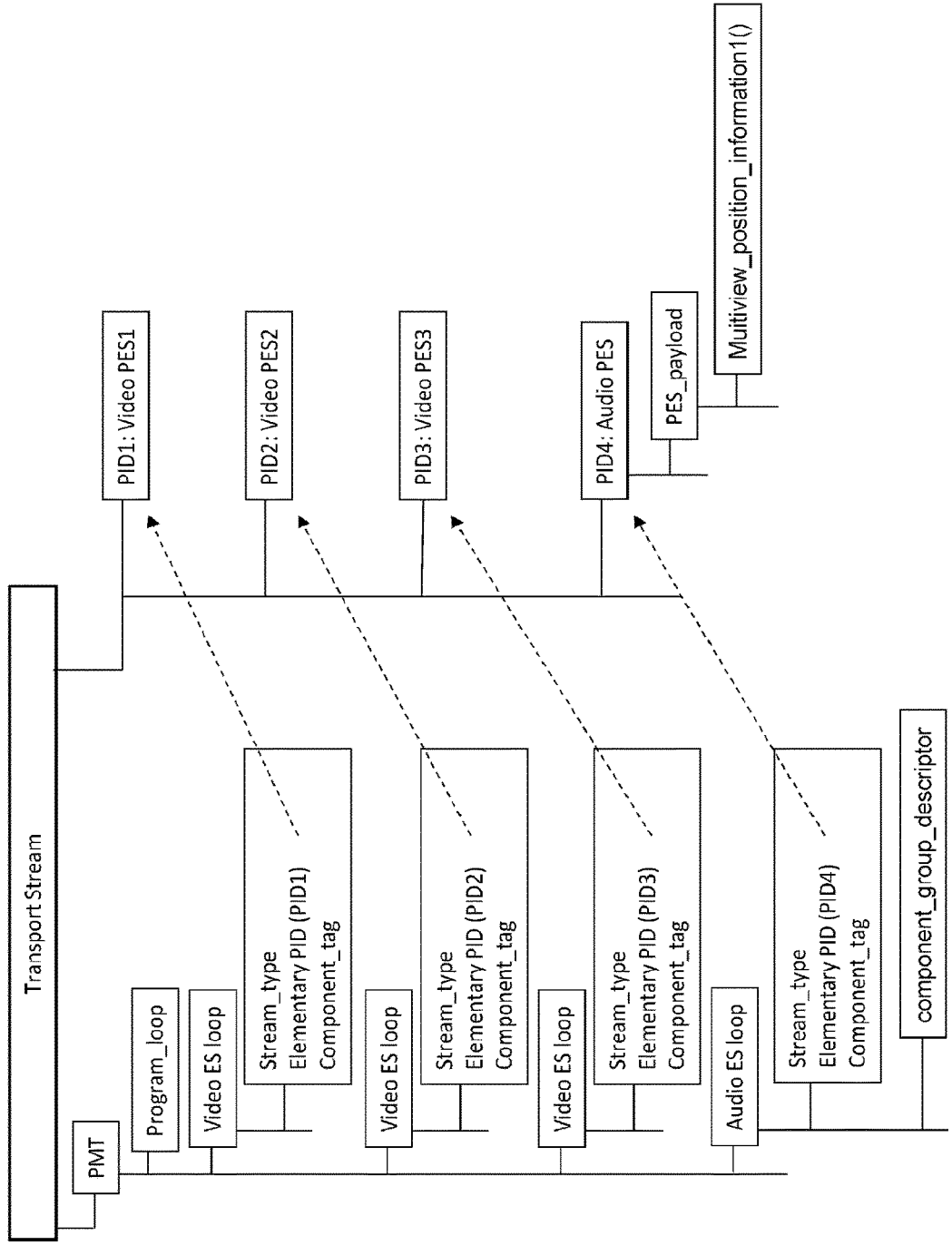
FIG. 12 is a diagram illustrating a configuration example of a transport stream TS of a case where difference components VP2 and VP3 are inserted into a layer of an audio stream.

FIG. 12 illustrates a configuration example of the transport stream TS of a case where the difference components VP2 and VP3 are inserted into the layer of the audio stream. In this case, in the transport stream TS, a PES packet "Video PES1" of a video stream including video data of the view 1 (View1), a PES packet "Video PES2" of a video stream including video data of the view 2 (View2), and a PES packet "Video PES3" of a video stream including video data of the view 3 (View3) are present.

Further, in the transport stream TS, a PES packet "audio PES" of the audio stream is present. The above-mentioned multiview position information 1 (multiview_Position_information1( )) (see FIG. 9) is inserted into the PES payload of the PES packet of the audio stream.

Further, the transport stream TS includes a program map table (PMT) as program specific information (PSI). This PSI is information indicating a program to which each elementary stream included in the transport stream belongs. In the PMT, a program descriptor that describes information related to the entire program is present.

Further, in this PMT, an elementary stream loop having information related to each elementary stream is present. In this configuration example, video elementary stream loops (Video ES loops) respectively corresponding to the three video streams are present, and an audio elementary stream loop (Audio ES loop) corresponding to the audio stream is present.

In each loop, pieces of information, such as the packet identifier (PID), the component_tag (Component_tag), the stream type (Stream_Type), are arranged. Further, in the audio elementary stream loop, the above-mentioned component group descriptor (component_group_descriptor) (see FIG. 11) is arranged.

"(2) A Case where Difference Components are Inserted into a Layer of a Video Stream"

A case where the difference components VP2 and VP3 are inserted into a layer of a video stream will be described. In this case, the video encoder 113 inserts the difference component VP2 into the layer of the video stream as the position correction information. Further, in this case, the video encoder 114 inserts the difference component VP3 into the layer of the video stream as the position correction information. In this case, the difference component is inserted into the user data region.

First, a case where MPEG2 encoding is performed will be described. FIG. 13 illustrates a configuration example (Syntax) of a video sequence (Video_sequence). In this video sequence (Video_sequence), a field of extension_and_user_data (2) is present. FIG. 14(a) illustrates a configuration example (Syntax) of the extension_and_user_data (2).

In this extension_and_user_data (2), the field of user data (user_data( )) is present. FIG. 14(b) illustrates a configuration example (Syntax) of this user data. By inserting "0x47413934" ("GA94") into a 32-bit field of "user_data_identifier", "ATSC_user_data( )" is included in the field of "user_structure( )".

FIG. 14(c) illustrates a configuration example (Syntax) of "ATSC_user_data( )". By inserting, for example, "0x07" indicating multiview position information 2 (multiview_Position_information2( )) into an 8-bit field of "user data_type_code", the multiview position information 2 (multiview_Position_information2 ( )) is included in the field of "user_data_type_structure( )".

FIG. 15 illustrates a configuration example (Syntax) of multiview position information 2 (multiview_Position_information2( )). A 1-bit field of "process_multiview" is a flag indicating a multiview. In the case of the multiview, a difference component field is present.

In the multiview position information 2 inserted into the layer of the video stream including the video data of the view 2 (View2), the field of the difference component VP2 is present. In the multiview position information 2 inserted into the layer of the video stream including the video data of the view 3 (View3), the field of the difference component VP3 is present.

The difference component field is composed of an 8-bit field of "Δx", an 8-bit field of "Δy", an 8-bit field of "Δz", a 9-bit field of "Δθ", and a 7-bit field of "Δφ".

The field of "Δx" indicates Δx, i.e., the value of the X-coordinate of a target view centered on the view 1 (View1) as an origin. The field of "Δy" indicates Δy, i.e., the value of the y-coordinate of a target view centered on the view 1 (View1) as an origin. The field of "Δz" indicates Δz, i.e., the value of the z-coordinate of a target view centered on the view 1 (View1) as an origin. The field of "Δθ" indicates Δθ, i.e., the difference of θ with respect to the view 1 (View1). The field of "Δφ" indicates Δφ, i.e., the difference t with respect to the view 1 (View1).

Next, a case where encoding such as MPEG4-AVC or HEVC is performed will be described. FIG. 16(a) illustrates a configuration example (Syntax) of user data SEI. By inserting "0x47413934" ("GA94") into a 32-bit field of "USER_identifier", "ATSC1_data( )" is included in the field of "USER_structure( )".

FIG. 16(b) illustrates a configuration example (syntax) of "ATSC1_data( )". By inserting, for example, "0x07" indicating the multiview position information 2 (multiview_Position_information2( )) into an 8-bit field of "user data_type_code", the multiview position information 2 (multiview_Position_information2 ( )) is included in the field of "user_data_type_structure( )".

Figure 17:
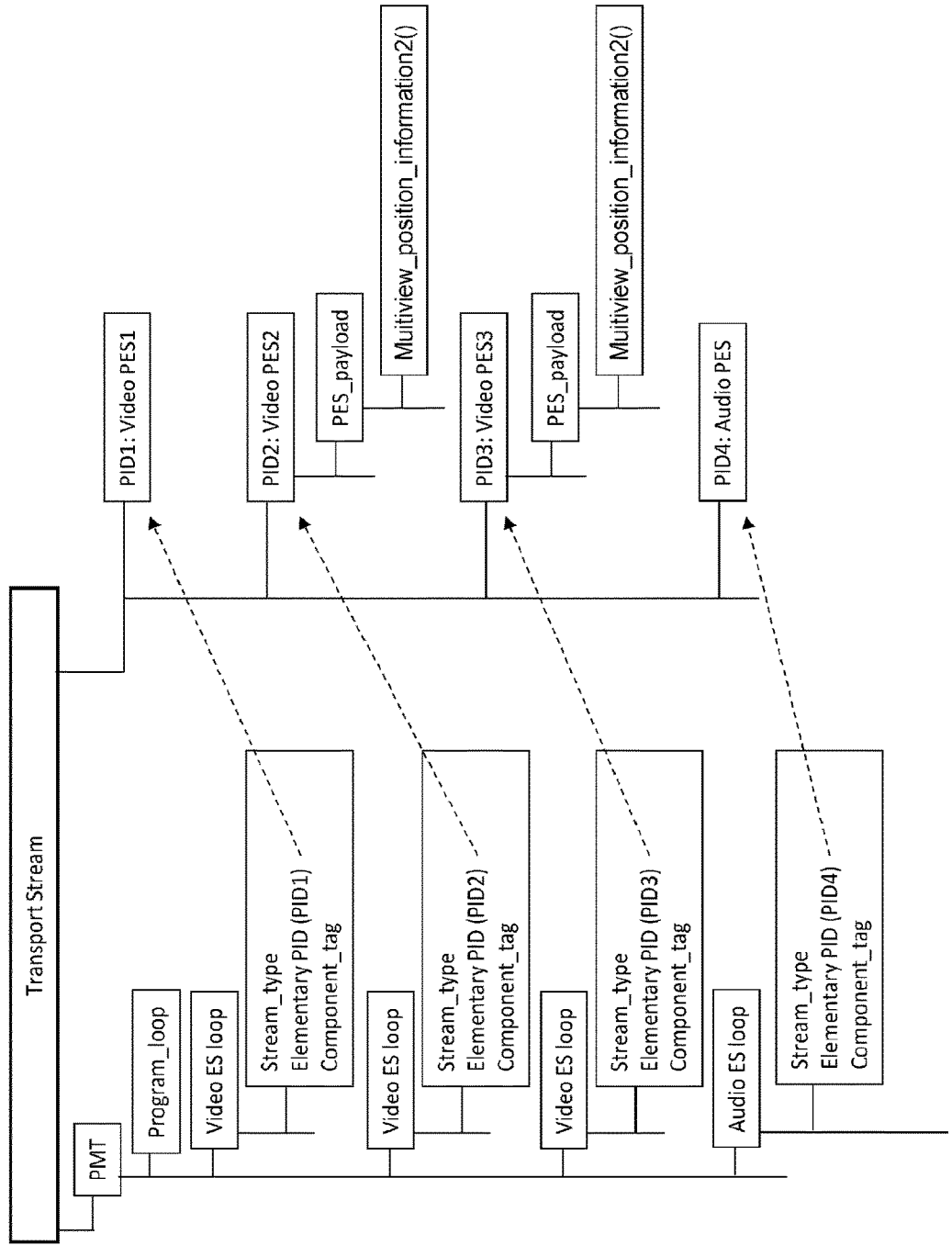
FIG. 17 is a diagram illustrating a configuration example of the transport stream TS of a case where the difference components VP2 and VP3 are inserted into a layer of a video stream.

FIG. 17 illustrates a configuration example of the transport stream TS of a case where the difference components VP2 and VP3 are inserted into the layer of the video stream. In FIG. 17, descriptions of parts corresponding to those shown in FIG. 12 are omitted as needed.

The above-mentioned multiview position information 2 (multiview_Position_information2( )) (see FIG. 15) is inserted into the PES packet "Video PES2" including the video data of the view 2 (View2). Further, the above-mentioned multiview position information 2 (multiview_Position_information2( )) (see FIG. 15) is inserted into the PES packet "Video PES3" of the video stream including the video data of the view 3 (View3).

Note that in a case where the difference components VP2 and VP3 are inserted into the layer of the video stream, the correlation between the difference components and the video stream is clear. Accordingly, in this case, there is no need to insert the component_group_descriptor (component_group_descriptor) into the layer of the container (system).

"(3) A Case where Difference Components are Inserted into a Layer of a Container (System)"

A case where the difference components VP2 and VP3 are inserted into a layer of a container (system) will be described. In this case, the difference components are inserted as signaling information or a position correction information stream.

First, a case where the difference components VP2 and VP3 are inserted as signaling will be described. In this case, the system encoder 116 inserts multiview position information descriptor (multiview_Position_information descriptor) into the video elementary stream loop corresponding to the video streams of the view 2 (View2) and the view 3 (View3).

FIG. 18 is a configuration example (Syntax) of the multiview position information descriptor. An 8-bit field of "descriptor_tag" indicates a descriptor type. In this case, the 8-bit field indicates the multiview position information descriptor. An 8-bit field of "descriptor_length" indicates the length (size) of the descriptor, and the length of the descriptor is indicated by the number of subsequent bytes.

A 1-bit field of "PTS_flag" is flag information indicating that time information (PTS) corresponding to the acquired positional information of the object sound source is present. When the 1-bit field indicates "1", 33-bit time information is present. Further, in this descriptor, a difference component field is present.

The field of the difference component VP2 is present in the multiview position information descriptor to be inserted into the video elementary stream loop corresponding to the video stream of the view 2 (View2). Further, the field of the difference component VP3 is present in the multiview position information descriptor to be inserted into the video elementary stream loop corresponding to the video stream of the view 3 (View3).

The difference component field is composed of an 8-bit field of "Δx", an 8-bit field of "Δy", an 8-bit field of "Δz", a 9-bit field of "Δθ", and a 7-bit field of "Δϕ".

The field of "Δx" indicates Δx, i.e., the value of the X-coordinate of a target view centered on the view 1 (View1) as an origin. The field of "Δy" indicates Δy, i.e., the value of the y-coordinate of a target view centered on the view 1 (View1) as an origin. The field of "Δz" indicates Δz, i.e., the value of the z-coordinate of a target view centered on the view 1 (View1) as an origin. The field of "Δθ" indicates Δθ, i.e., the difference of θ with respect to the view 1 (View1). The field of "Δϕ" indicates Δθ, i.e., the difference t with respect to the view 1 (View1).

Figure 19:
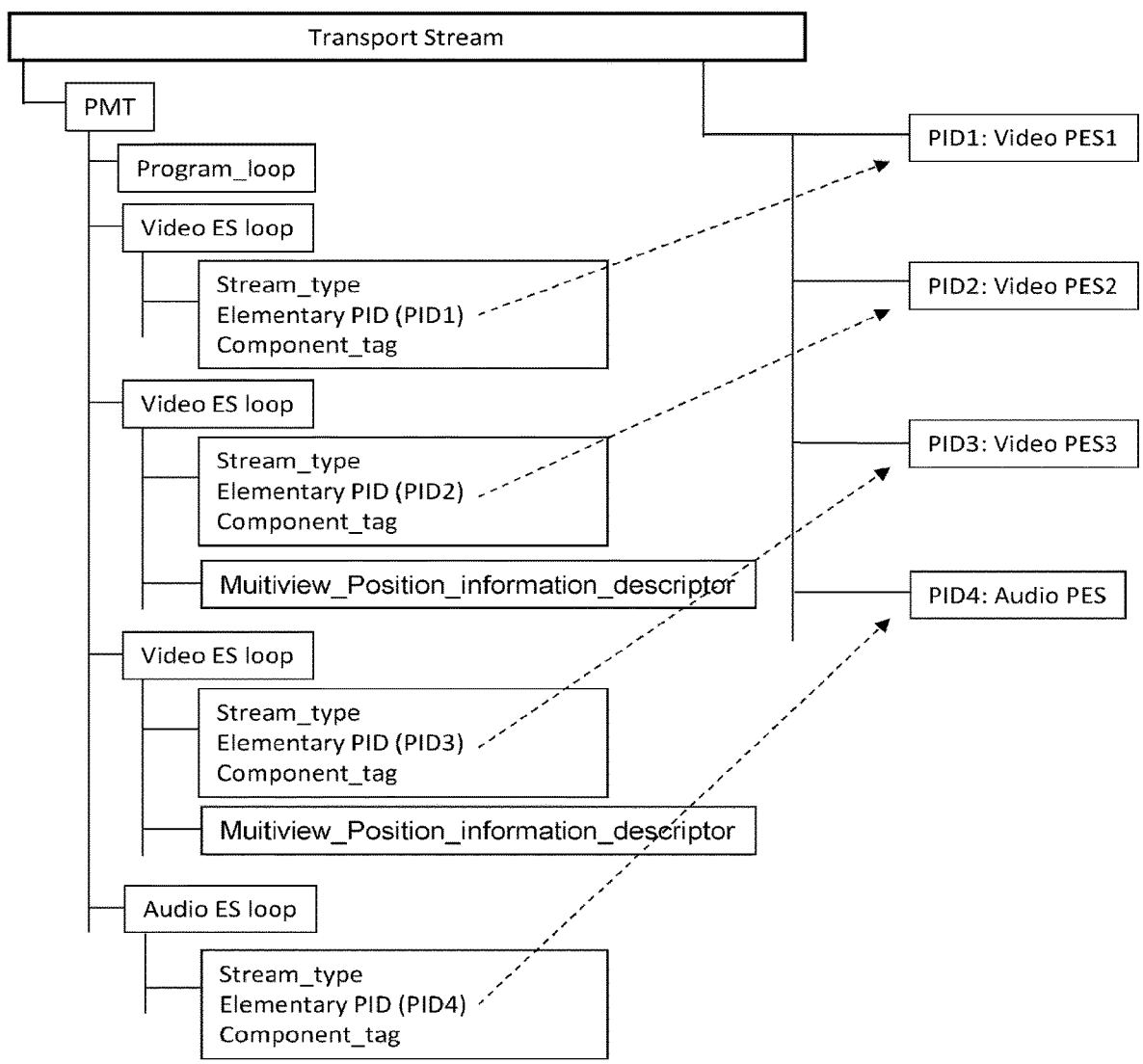
FIG. 19 is a diagram illustrating a configuration example of the transport stream TS of a case where the difference components VP2 and VP3 are inserted into a layer of a container (system) as signaling.

FIG. 19 illustrates a configuration example of the transport stream TS of a case where the difference components VP2 and VP3 are inserted into the layer of the container (system) as signaling. In FIG. 19, descriptions of parts corresponding to those shown in FIG. 12 are omitted as needed.

In the video elementary stream loop corresponding to the video stream of the view 2 (View2), the multiview position information descriptor in which the above-mentioned difference component VP2 is present is inserted. Further, in the video elementary stream loop corresponding to the video stream of the view 3 (View3), the multiview position information descriptor in which the above-mentioned difference component VP3 is present is inserted.

Figure 20:
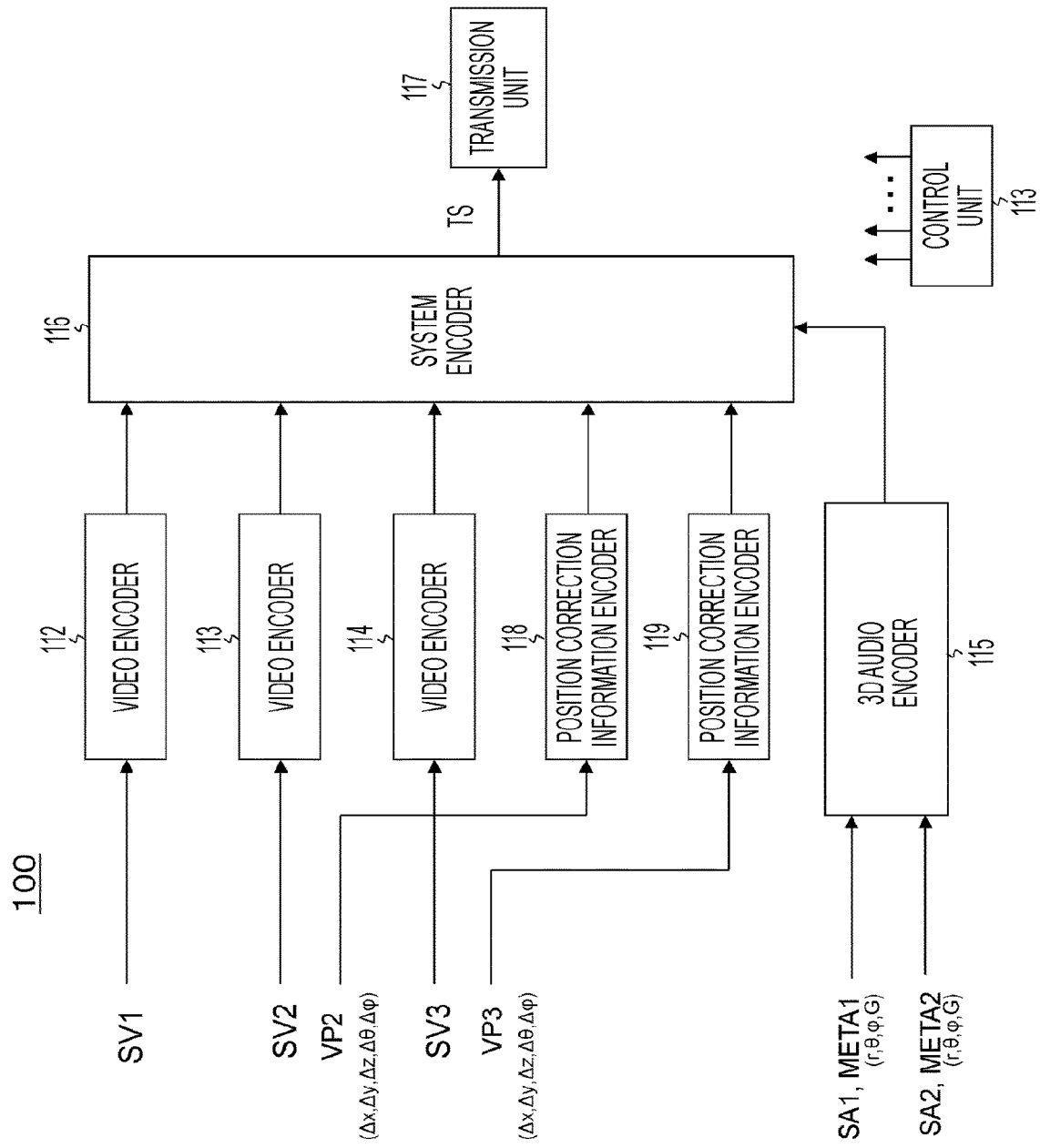
FIG. 20 is a block diagram illustrating another configuration example of a transmission device.

Next, a case where the difference components VP2 and VP3 are inserted as the position correction information stream will be described. FIG. 20 illustrates a configuration example of the transmission device 100 in this case. In FIG. 20, parts corresponding to those shown in FIG. 6 are denoted by the same reference numerals and detailed descriptions thereof are omitted as needed.

This transmission device 100 includes position correction information encoders 118 and 119. The position correction information encoder 118 performs encoding on the difference component VP2 and generates a position correction information stream. Further, the position correction information encoder 118 performs encoding on the difference component VP3 and generates a position correction information stream.

The system encoder 116 packetizes the video streams output from the video encoders 112, 113, and 114, the audio stream output from the 3D audio encoder 115, and the position correction information streams output from the position correction information encoders 118 and 119 into PES packets, and further transforms the packets into transport packets and multiplexes the packets, to thereby obtain the transport stream TS as a multiplexed stream.

FIG. 21 illustrates a configuration example (Syntax) of the position correction information stream (elementary stream). An 8-bit field of "data_identifier" is a value indicating PES data of the position correction information. A 4-bit field of "PES_data_packet_header_length" indicates the length of the field of "PES_Data_private_data_byte". Service-dependent private data is inserted into the field of "PES_Data_private_data_byte".

Further, in this position correction information stream, the difference component field of the corresponding view is present. This difference component field is composed of an 8-bit field of "Δx", an 8-bit field of "Δy", an 8-bit field of "Δz", a 9-bit field of "Δθ", a 7-bit field of "Δϕ".

The field of "Δx" indicates Δx, i.e., the value of the X-coordinate of a target view centered on the view 1 (View1) as an origin. The field of "Δy" indicates Δy, i.e., the value of the y-coordinate of a target view centered on the view 1 (View1) as an origin. The field of "Δz" indicates Δz, i.e., the value of the z-coordinate of a target view centered on the view 1 (View1) as an origin. The field of "Δθ" indicates Δθ, i.e., the difference of θ with respect to the view 1 (View1). The field of "Δϕ" indicates Δϕ, i.e., the difference ϕ with respect to the view 1 (View1).

Figure 22:
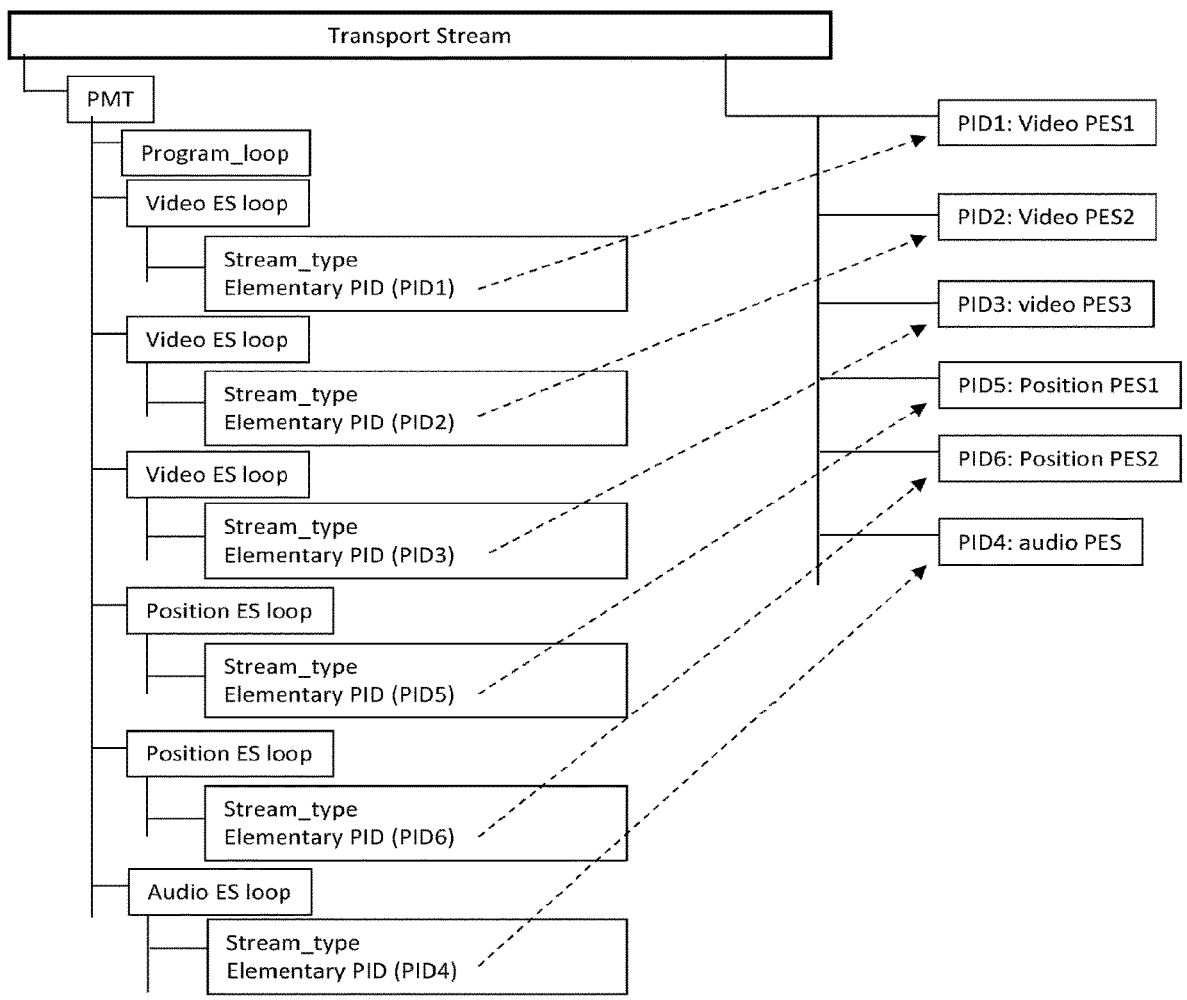
FIG. 22 is a diagram illustrating a configuration example of the transport stream TS of a case where difference components VP2 and VP3 are inserted as a position correction information stream.

FIG. 22 illustrates a configuration example of the transport stream TS of a case where the difference components VP2 and VP3 are inserted as the position correction information stream. In FIG. 22, descriptions of parts corresponding to those shown in FIG. 12 are omitted as needed.

In the transport stream TS, a PES packet "Position PES1" of the position correction information stream including the difference component VP2 related to the view 2 (View2) and a PES packet "Position PES2" of the position correction information stream including the difference component VP3 related to the view 3 (View3) are present. Further, in the PMT, the position correction information/elementary stream loops (Position ES loops) respectively corresponding to the two position correction information streams are present.

FIG. 23 is a list of transmission systems for the above-mentioned position correction information. (1) The case where difference components are inserted into a layer of an audio stream has, for example, such characteristics that "The audio collection position information and position correction information are added to audio signals. It is sufficient that information is transmitted to a position correction operation circuit only from the audio signals. Since the information is included in the same audio signals, the synchronization of these signals is guaranteed."

Further, (2) the case where difference components are inserted into a layer of a video stream has, for example, such characteristics that "The corresponding position correction information is added to each video signal. Only the information necessary for each video is transmitted, which prevents transmission of extra information (the amount of information to be transmitted is small). In a case where video is selected in re-transmission, the position correction information is directly transmitted, which eliminates extra processing."

Further, (3) the case where difference components are inserted into a layer of a container (system) has such characteristics that, for example, when the difference components are inserted as signaling, "Information necessary in the layer of the system can be discriminated by transmitting the information as a descriptor."; for example, when the difference components are inserted as the position correction information stream, "The position correction information as well as a time line is transmitted as an independent stream corresponding to each video signal. In a case where video is selected in re-transmission, the corresponding position correction information can be selected and transmitted."

The operation of the transmission device 100 is simply illustrated in FIG. 6. The video data SV1 on the view 1, the video data SV2 on the view 2, and the video data SV3 on the view 3 are supplied to the video encoders 112, 113, and 114, respectively. The video encoders 112, 113, and 114 perform encoding, such as MPEG2, MPEG4-AVC, or HEVC on each of the video data SV1, SV2, and SV3, to thereby obtain a video stream.

The object data SA1 and META1 related to the object sound source 1, and the object data SA2 and META2 related to the object sound source 2 are supplied to the 3D audio encoder 115. The 3D audio encoder 115 performs, for example, MPEG-H 3D Audio encoding on the object data related to the object sound sources 1 and 2, to thereby obtain an audio stream.

The video streams obtained by the video encoders 112, 113, and 114 are supplied to the system encoder 116. The audio stream obtained by the 3D audio encoder 115 is supplied to the system encoder 116. The system encoder 116 packetizes the streams supplied from the encoders into PES packets, and further transforms the packets into transport packets and multiplexes the packets, to thereby obtain the transport stream TS as a multiplexed stream.

The transport stream TS obtained by the system encoder 116 is supplied to the transmission unit 117. The transmission unit 117 transmits the transport stream TS carried on a broadcast wave or packets on a network to the reception device 200.

Further, in the transmission device 100, the difference components VP2 of the positions and orientations of the view 1 and the view 2 and the difference components VP3 of the positions and orientations of the view 1 and the view 3 are inserted into (1) the layer of the audio stream, (2) the layer of the video stream, or (3) the layer of the container, and are transmitted to the reception device 200.

Configuration Example of Reception Device

Figure 24:
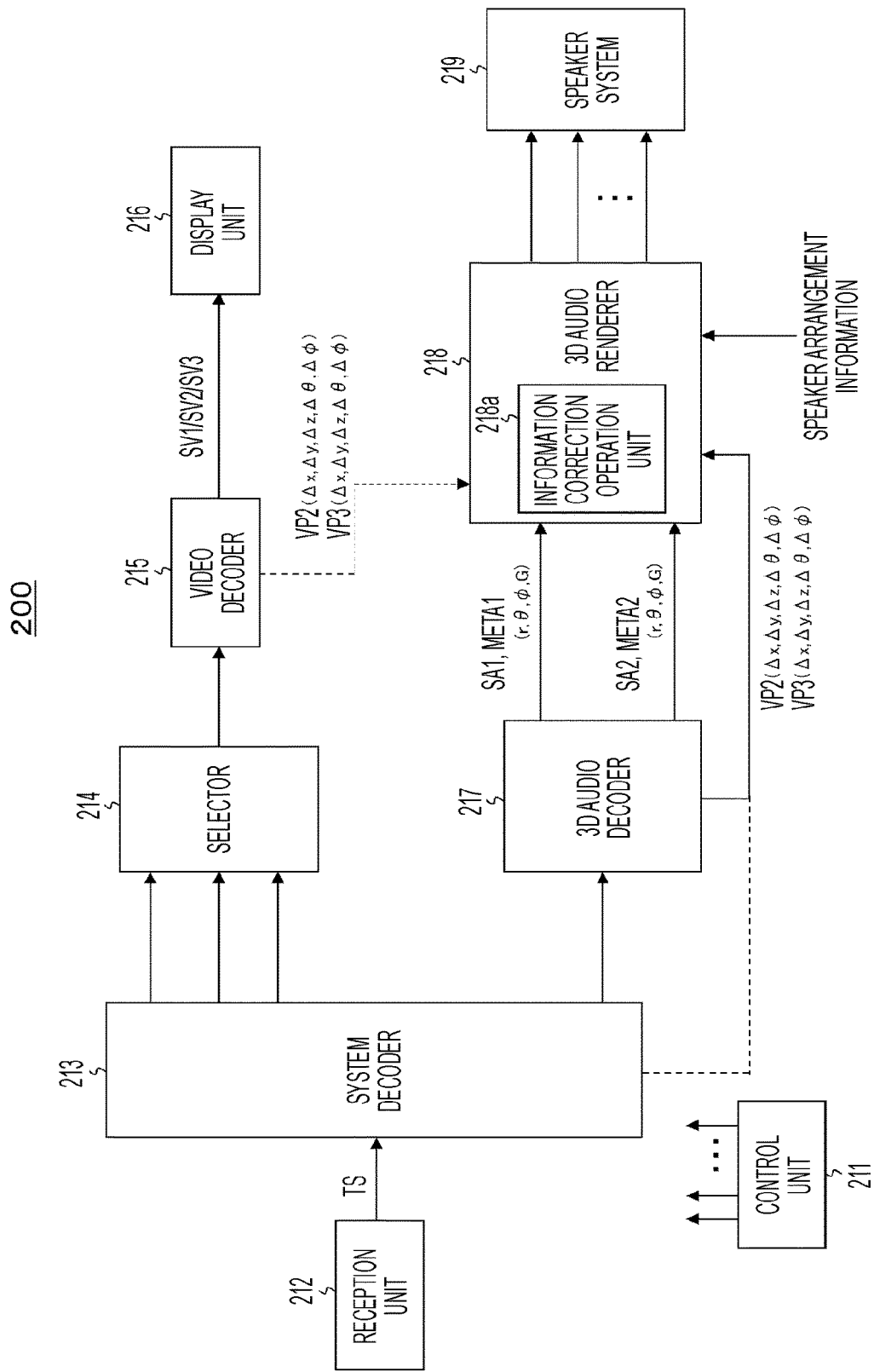
FIG. 24 is a block diagram illustrating a configuration example of a reception device.

FIG. 24 illustrates a configuration example of the reception device 200. This reception device 200 includes a control unit 211, a reception unit 212, a system decoder 213, a selector 214, a video decoder 215, a display unit 216, a 3D audio decoder 217, a 3D audio renderer 218, and a speaker system 219. The control unit 211 controls the operation of each part of the reception device 200.

The reception unit 212 receives the transport stream TS which is transmitted from the transmission device 100 and carried on a broadcast wave or packets on a network. This transport stream TS includes three video streams having the video data of the view 1, the video data of the view 2, and the video data of the view 3, respectively, and an audio stream having the audio data and positional information of the object sound source 1 and the object sound source 2 (see FIG. 2).

The system decoder 213 extracts packets of the three video streams having the video data of the view 1, the video data of the view 2, and the video data of the view 3, respectively, from the transport stream TS, and reconfigures the three video streams. Further, the system decoder 213 extracts packets of the audio stream from the transport stream TS, and reconfigures the audio stream.

The system decoder 213 extracts various pieces of information, such as descriptor information, from the transport stream TS, and transmits the information to the control unit 211. The various pieces of information include information of the multiview position information descriptor (multiview_Position_information_descriptor) (see FIG. 18) of a case where the difference components VP2 and VP3 are inserted as signaling. Further, the various pieces of information include information of the component_group_descriptor (component_group_descriptor) (see FIG. 11) of a case where the difference components are inserted into the layer of the audio stream.

The selector 214 selectively outputs anyone of the three video streams reconfigured by the system decoder 213 on the basis of the selection control by the control unit 211 depending on the selection of a view by a user. The video decoder 215 performs decoding processing on the video stream output from the selector 214 and obtains video data of the view selected by the user.

Further, the video decoder 215 extracts various pieces of information inserted into the layer of the video stream, and transmits the information to the control unit 211. The various pieces of information include information of the multiview position information 2 (multiview_Position_information2 ( )) (see FIG. 15) of a case where the difference components VP2 and VP3 are inserted into the layer of the video stream.

The display unit 216 includes a display panel such as a liquid crystal display (LCD) or an organic electroluminescence display (organic EL display). The display unit 216 performs scaling processing, image quality adjustment processing, or the like on the video data obtained by the video decoder 215 to thereby obtain display video data, and displays images corresponding to the display video data on the display panel.

The 3D audio decoder 217 performs decoding processing on the audio stream reconfigured by the system decoder 213, and obtains the object data related to the object sound sources 1 and 2.

In this case, the object data related to the object sound source 1 is composed of the object audio data SA1 and the object metadata META1, and the object metadata META1 includes the coordinate values of the polar coordinates s (r, θ, φ) of the object sound source 1 and the gain value. Further, the object data related to the object sound source 2 is composed of the object audio data SA2 and the object metadata META2, and the object metadata META2 includes the coordinate values of the polar coordinates s (r, θ, φ) of the object sound source 2 and the gain value.

Further, the 3D audio decoder 217 extracts various pieces of information inserted into the layer of the audio stream, and transmits the information to the control unit 211. The various pieces of information include information of the multiview position information 1 (multiview_Position_information1( )) (see FIG. 9) of a case where the difference components VP2 and VP3 are inserted into the layer of the audio stream.

The 3D audio renderer 218 obtains audio data of a predetermined channel compatible with the speaker system 219 on the basis of the object data (audio data, positional information) related to the object sound sources 1 and 2 obtained by the 3D audio decoder 217. In this case, the 3D audio renderer 218 refers to speaker arrangement information, and maps the audio data of each object sound source to a speaker present at any position on the basis of the positional information.

The 3D audio renderer 218 includes a position correction operation unit 218a. In a case where the view 1 is selected, the 3D audio renderer 218 uses, as it is, positional information (r, θ, φ) included in the object data (audio data, positional information) related to the sound sources 1 and 2 obtained by the 3D audio decoder 217.

In a case where the view 2 or view 3 is selected, the 3D audio renderer 218 uses positional information (r', θ', φ') obtained after correcting, by the position correction operation unit 218a, the positional information (r, θ, φ) included in the object data (audio data, positional information) related to the sound sources 1 and 2 obtained by the 3D audio decoder 217 by using the transformation shown in FIG. 5.

In this case, in a case where the view 2 is selected, the position correction operation unit 218a corrects (transforms) the positional information (r, θ, φ) based on the view 1 to the positional information (r', θ', φ') based on the view 2 by using the difference components VP2 (Δx, Δy, Δz, Δκ, Δφ) of the positions and orientations of the view 1 and the view 2. Further, in a case where the view 3 is selected, the position correction operation unit 218a corrects (transforms) the positional information (r, θ, φ) based on the view 1 to the positional information (r', θ', φ') based on the view 3 by using the difference components VP3 (Δx, Δy, Δz, Δκ, Δφ) of the positions and orientations of the view 1 and the view 3.

The speaker system 219 obtains the audio output corresponding to the display image of the display unit 216 on the basis of the audio data of the predetermined channel obtained by the 3D audio renderer 218.

The operation of the reception device 200 shown in FIG. 24 is simply illustrated. The reception unit 212 receives the transport stream TS which is transmitted from the transmission device 100 and carried on a broadcast wave or packets on a network. This transport stream TS includes three video streams having the video data of the view 1, the video data of the view 2, and the video data of the view 3, respectively, and an audio stream having the audio data and positional information of the object sound source 1 and the object sound source 2. This transport stream TS is supplied to the system decoder 213.

The system decoder 213 extracts packets of the three video streams having the video data of the view 1, the video data of the view 2, and the video data of the view 3, respectively, from the transport stream TS, and reconfigures the three video streams. Further, the system decoder 213 extracts packets of the audio stream from the transport stream TS, and reconfigures the audio stream.

Further, the system decoder 213 extracts various pieces of information, such as descriptor information, from the transport stream TS, and sends the information to the control unit 211. The various pieces of information also include information of multiview position information descriptor (see FIG. 18) of a case where the difference components VP2 and VP3 are inserted as signaling. The various pieces of information also include information of the component group descriptor (see FIG. 11) of a case where the difference components are inserted into the layer of the audio stream.

The three video streams reconfigured by the system decoder 213 are supplied to the selector 214. In the selector 214, any one of the three video streams is selectively output on the basis of the selection control by the control unit 211 depending on the selection of a view by the user. The video stream output from the selector 214 is supplied to the video decoder 215. The video decoder 215 performs decoding processing on the video streams, and obtains video data of the view selected by the user.

Further, the video decoder 215 extracts various pieces of information inserted into the layer of the video stream, and transmits the information to the control unit 211. The various pieces of information also include information of the multiview position information 2 (see FIG. 15) of a case where the difference components VP2 and VP3 are inserted into the layer of the video stream.

The video data obtained by the video decoder 215 is supplied to the display unit 216. The display unit 216 performs scaling processing, image quality adjustment processing, or the like on the video data obtained by the video decoder 215 to thereby obtain the display video data, and displays images corresponding to the display video data on the display panel.

Further, the audio stream reconfigured by the system decoder 213 is supplied to the 3D audio decoder 217. The 3D audio decoder 217 performs decoding processing on the audio stream reconfigured by the system decoder 213, thereby obtaining the object data related to the object sound sources 1 and 2.

Further, the 3D audio decoder 217 extracts various pieces of information inserted into the layer of the audio stream and transmits the information to the control unit 211. The various pieces of information also include information of the multiview position information 1 (see FIG. 9) of a case where the difference components VP2 and VP3 are inserted into the layer of the audio stream.

The object data of the object sound sources 1 and 2 obtained by the 3D audio decoder 217 is supplied to the 3D audio renderer 218. The 3D audio renderer 218 obtains audio data of a predetermined channel compatible with the speaker system 219 on the basis of the object data (audio data, positional information) related to the object sound sources 1 and 2. In this case, the 3D audio renderer 218 refers to the speaker arrangement information, and maps the audio data of each object sound source to a speaker present at any position on the basis of the positional information.

In this case, in the 3D audio renderer 218, in a case where the view 2 is selected, the positional information (r, θ, φ) included in the object data (audio data, positional information) related to the sound sources 1 and 2 obtained by the 3D audio decoder 217 is corrected by the difference components (Δx, Δy, Δz, Δθ, Δφ) extracted from the layer of the container, the layer of the video stream, or the layer of the audio stream as described above and is used. Although detailed descriptions are omitted, the same holds true for the case where the view 3 is selected.

The audio data of the predetermined channel output from the 3D audio renderer 218 is supplied to the speaker system 219. In the speaker system 219, the audio output corresponding to the display image of the display unit 216 is obtained on the basis of the audio data of the predetermined channel.

Figure 25:
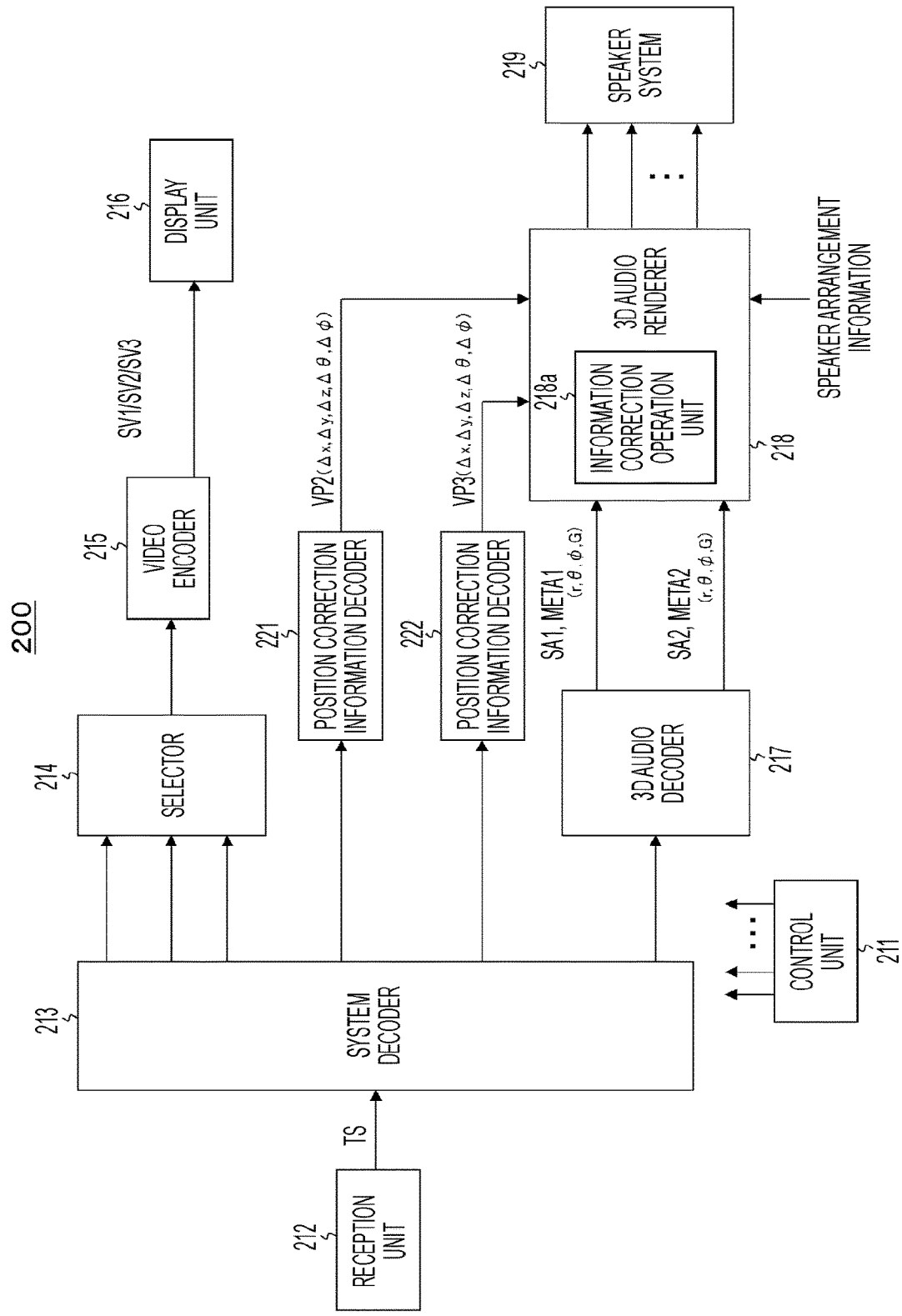
FIG. 25 is a block diagram illustrating another configuration example of the reception device.

FIG. 25 illustrates a configuration example of the reception device 200 of a case where the difference components VP2 and VP3 are inserted into the layer of the container as the position correction information stream. In FIG. 25, parts corresponding to those shown in FIG. 24 are denoted by the same reference numerals and detailed descriptions thereof are omitted as needed.

The system decoder 213 obtains two position correction information streams including the difference information VP2 and VP3 from the transport stream TS. The position correction information stream including the difference information VP2 is supplied to the position correction information decoder 221. The position correction information decoder 221 performs decoding on the position correction information stream, and obtains the difference component VP2. Further, the position correction information stream including the difference information VP3 is supplied to the position correction information decoder 222. The position correction information decoder 222 performs decoding on the position correction information stream, and obtains the difference components VP3.

These difference components VP2 and VP3 are supplied to the 3D audio renderer 218. The 3D audio renderer 218 refers to the speaker arrangement information, and maps the audio data of each object sound source to a speaker present at any position on the basis of the positional information (r, θ, φ). In this case, in a case where the view 2 and the view 3 are selected, the positional information (r', θ', φ') on the object sound sources 1 and 2 is corrected (transformed) and used on the basis of the difference components VP2 and VP3, respectively.

As described above, in the transmission/reception system 10 shown in FIG. 1, the transmission device 100 inserts the position correction information (difference components VP2 and VP3) for correcting (transforming) the positional information (r, θ, φ) based on the view 1 of each object sound source to the positional information (r', θ', φ') based on the views 2 and the view 3 into the layer of the audio stream, the layer of the video stream, or the layer of the container, and transmits the position correction information. Accordingly, in a case where switching of the view 2 and the view 3 is performed at the reception side, the corrected positional information of the object sound source can be used, thereby making it possible to accurately perform 3D audio rendering.

2. Modified Examples

Note that the embodiments described above illustrate an example in which the view 2 and the view 3 are present in addition to the view 1 and the object sound sources 1 and 2 are present. In the present technology, the number of views and the number of object sound sources are not limited to the examples.

Further, the embodiments described above illustrate an example in which the position correction information indicates the difference components (Δx, Δy, Δz, Δκ, A). However, in the present technology, the position correction information is not limited to the difference components (Δx, Δy, Δz, Δθ, Δφ).

Further, the embodiments described above illustrate an example of the reception device 200 that acquires the difference components VP2 and VP3 from the layer of the audio stream, the layer of the video stream, or the layer of the container. However, a configuration in which the difference components are acquired from a server connected to a network can also be employed. In this case, access information from the transmission device 100 to the reception device 200 may be inserted into the layer of the audio stream, the layer of the video stream, or the layer of the container, and may be transmitted.

Figure 26:
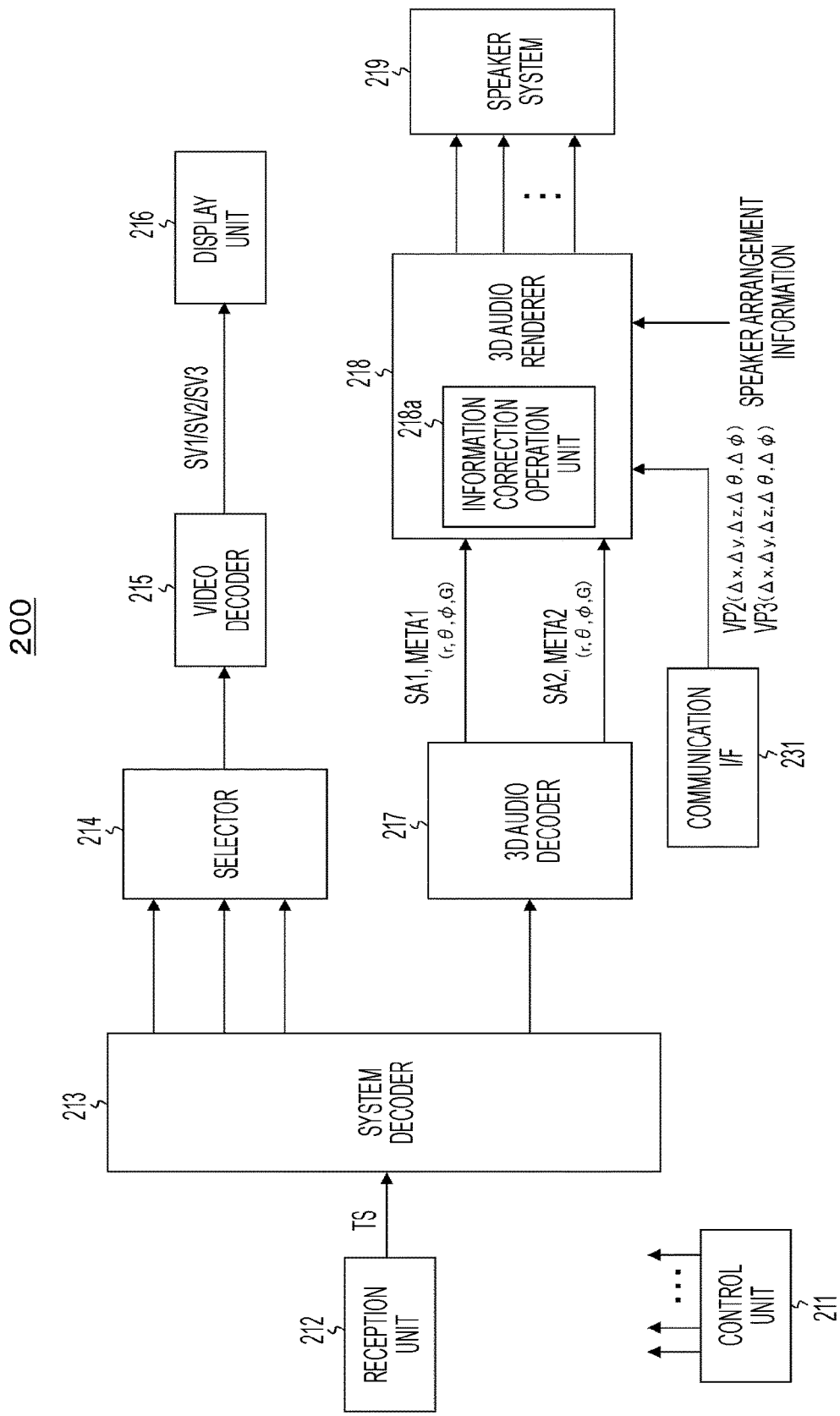
FIG. 26 is a block diagram illustrating still another configuration example of the reception device.

FIG. 26 illustrates a configuration example of the reception device 200 in this case. In FIG. 26, parts corresponding to those shown in FIG. 24 are denoted by the same reference numerals and detailed descriptions thereof are omitted as needed. A communication interface 231 accesses a server connected to a network, to thereby acquire the difference components VP2 and VP3.

These difference components VP2 and VP3 are supplied to the 3D audio renderer 218. The 3D audio renderer 218 refers to the speaker arrangement information, the audio data of each object sound source is mapped to a speaker present at any position on the basis of the positional information (r, θ, φ). In this case, in a case where the view 2 and the view 3 are selected, the positional information (r', θ', φ') on the object sound sources 1 and 2 is corrected (transformed) and used on the basis of the difference components VP2 and VP3, respectively.

Further, the embodiments described above illustrate an example in which the container is a transport stream (MPEG-2 TS). However, the present technology can also be applied to a system delivered by a container of MP 4 or a container of a format other than MP4. For example, the present technology can also be applied to a stream delivery system based on MPEG-DASH, a transmission/reception system that handles an MPEG media transport (MMT) structure transmission stream or the like.

Note that the present technology may also have the following configurations.

(1) A transmission device including:

an encode unit configured to generate a first video stream having video data of a first view, a second video stream having video data of a second view, and an audio stream having audio data of an object sound source and positional information based on the first view of the object sound source; and a transmission unit configured to transmit a container of a predetermined format including the first video stream, the second video stream, the audio stream, and position correction information for correcting the positional information of the object sound source to positional information based on the second view.

(2) The transmission device according to (1), wherein the position correction information indicates difference components of positions and orientations of the first view and the second view.

(3) The transmission device according to (1) or (2), wherein the position correction information is inserted into a layer of the audio stream.

(4) The transmission device according to (3), wherein the position correction information is inserted into a metadata region including the positional information.

(5) The transmission device according to (3), wherein the position correction information is inserted into a user data region.

(6) The transmission device according to (3), wherein when a plurality of the second views is present, a plurality of pieces of the position correction information is inserted into the layer of the audio stream, corresponding to the plurality of the second views, and information indicating the second video streams to which the plurality of pieces of the position correction information respectively correspond is inserted into a layer of the container.

(7) The transmission device according to (1) or (2), wherein the position correction information is inserted into a layer of the second video stream.

(8) The transmission device according to (1) or (2), wherein the position correction information is inserted into a layer of the container.

(9) The transmission device according to (8), wherein the position correction information is inserted as signaling information.

(10) The transmission device according to (9), wherein the container is MPEG2-TS, and the position correction information is inserted into a video elementary stream loop corresponding to the second video stream of a program map table.

(11) The transmission device according to (8), wherein an information stream including the position correction information is inserted.

(12) A transmission method including:

an encode step of generating a first video stream having video data of a first view, a second video stream having video data of a second view, and an audio stream having audio data of an object sound source and positional information based on the first view of the object sound source; and a transmission step of transmitting, by a transmission unit, a container of a predetermined format including the first video stream, the second video stream, the audio stream, and position correction information for correcting the positional information of the object sound source to positional information based on the second view.

(13) A reception device including:
a reception unit configured to receive a container of a predetermined format including a first video stream having video data of a first view, a second video stream having video data of a second view, an audio stream having audio data of an object sound source and positional information based on the first view of the object sound source, and position correction information for correcting the positional information of the object sound source to positional information based on the second view; and
a processing unit configured to process information included in the container.

(14) The reception device according to (13), wherein the processing unit includes
a decode unit configured to obtain the video data of the first view, the video data of the second view, the audio data and positional information of the object sound source from the first video stream, the second video stream, and the audio stream,
a selector configured to selectively output the video data of the first view or the video data of the second view,
a rendering unit configured to map the audio data of the object sound source to any speaker position on the basis of the positional information of the object sound source, and
the rendering unit uses the positional information corrected on the basis of the position correction information in such a way that the positional information is based on the second view, when the video data of the second view is selected by the selector.

(15) A reception method including:
a reception step of receiving, by a reception unit, a container of a predetermined format including a first video stream having video data of a first view, a second video stream having video data of a second view, an audio stream having audio data of an object sound source and positional information based on the first view of the object sound source, and position correction information for correcting the positional information of the object sound source to positional information based on the second view; and
a processing step of processing information included in the container.

(16) A reception device including:
a reception unit configured to receive a container of a predetermined format including a first video stream having video data of a first view, a second video stream having video data of a second view, and an audio stream having audio data of an object sound source and positional information based on the first view of the object sound source;
an acquisition unit configured to acquire position correction information for correcting the positional information of the object sound source to positional information based on the second view;
a decode unit configured to obtain the video data of the first view, the video data of the second view, the audio data and positional information of the object sound source from the first video stream, the second video stream, and the audio stream, respectively;
a selector configured to selectively output the video data of the first view or the video data of the second view; and
a rendering unit configured to map the audio data of the object sound source to any speaker position on the basis of the positional information of the object sound source,
wherein the rendering unit uses the positional information corrected on the basis of the position correction information in such a way that the positional information is based on the second view, when the video data of the second view is selected by the selector.

(17) The reception device according to (16), wherein the acquisition unit acquires the position correction information from a layer of the audio stream, a layer of the second video stream, or a layer of the container.

(18) The reception device according to (16), wherein the acquisition unit acquires the position correction information from a server on a network.

(19) A reception method including:
a reception step of receiving, by a reception unit, a container of a predetermined format including a first video stream having video data of a first view, a second video stream having video data of a second view, and an audio stream having audio data of an object sound source and positional information based on the first view of the object sound source;
an acquisition step of acquiring position correction information for correcting the positional information of the object sound source to positional information based on the second view;
a decode step of obtaining the video data of the first view, the video data of the second view, the audio data and positional information of the object sound source from the first video stream, the second video stream, and the audio stream;
a select step of selectively outputting the video data of the first view or the video data of the second view;
a rendering step of obtaining audio data compatible with a speaker system on the basis of the audio data and positional information of the object sound source,
wherein in the rendering step, the positional information corrected on the basis of the position correction information is used in such a way that the positional information is based on the second view, when the video data of the second view is selected in the select step.

REFERENCE SIGNS LIST

10 Transmission/reception system
100 Transmission device
111 Control unit
112, 113, 114 Video encoder
115 3D audio encoder
116 System encoder
117 Transmission unit
118, 119 Position correction information encoder
200 Reception device
211 Control unit
212 Reception unit
213 System decoder
214 Selector
215 Video decoder
216 Display unit
217 3D audio decoder
218 3D audio renderer
218a Position correction operation unit
219 Speaker system
221, 222 Position correction information decoder
231 Communication interface

The invention claimed is:

1. A transmission device comprising:
an encoder configured to generate a first video stream having video data of a first view of a first camera, a second video stream having video data of a second view of a second camera, and an audio stream having audio data of an object sound source, the audio data being captured at a position of the first camera and corresponding to the first view of the object sound source; and
a transmitter configured to transmit a container including the first video stream, the second video stream, the audio stream, and position correction information including difference components indicating a difference between a position and an orientation of the second view with respect to the first view, which corresponds to the position of the first camera at which the audio data was captured, such that a receiving device configured to receive the transmitted container is configured to apply the difference components of the position correction information to the audio stream in order to modify correspondence of the audio data from the position of the first camera to a position of the second camera.

2. The transmission device according to claim 1, wherein a layer of the audio stream includes the position correction information.

3. The transmission device according to claim 2, wherein the container includes a plurality of second video streams corresponding to a plurality of second views, the container further includes a plurality of pieces of the position correction information corresponding to the plurality of the second views included in the layer of the audio stream, each piece of the plurality of the pieces of the position correction information including difference components indicating a difference between a position and an orientation of a respective one of the plurality of the second views with respect to the first view, and
information indicating the second video streams to which the plurality of pieces of the position correction information respectively correspond is included in a layer of the container.

4. The transmission device according to claim 1, wherein a layer of the second video stream includes the position correction information.

5. The transmission device according to claim 1, wherein a layer of the container includes the position correction information.

6. A transmission method comprising:
generating a first video stream having video data of a first view of a first camera, a second video stream having video data of a second view of a second camera, and an audio stream having audio data of an object sound source, the audio data being captured at a position of the first camera and corresponding to the first view of the object sound source; and
transmitting, by a transmitter, a container including the first video stream, the second video stream, the audio stream, and position correction information including difference components indicating a difference between a position and an orientation of the second view with respect to the first view, which corresponds to the position of the first camera at which the audio data was captured, such that a receiving device configured to receive the transmitted container is configured to apply the difference components of the position correction information to the audio stream in order to modify correspondence of the audio data from the position of the first camera to a position of the second camera.

7. A reception device comprising:
a receiver configured to receive a container including a first video stream having video data of a first view of a first camera, a second video stream having video data of a second view of a second camera, an audio stream having audio data of an object sound source, the audio data being captured at a position of the first camera and corresponding to the first view of the object sound source, and position correction information including difference components indicating a difference between a position and an orientation of the second view with respect to the first view, which corresponds to the position of the first camera at which the audio data was captured; and
a processor configured to, in response to a selection of the second view, transform the audio data of the object sound source based on the position correction information included in the container by applying the difference components of the position correction information to the audio stream in order to modify correspondence of the audio data from the position of the first camera to a position of the second camera.

8. The reception device according to claim 7, wherein the processor is configured to
obtain the video data of the first view, the video data of the second view, the audio data and positional information of the object sound source from the first video stream, the second video stream, and the audio stream,
selectively output the video data of the first view or the video data of the second view,
map the audio data of the object sound source to any speaker position on the basis of the positional information of the object sound source, and
correct the positional information on the basis of the position correction information in such a way that the positional information is based on the second view, when the video data of the second view is selectively output.

9. The reception device according to claim 7, wherein a layer of the audio stream includes the position correction information.

10. The reception device according to claim 9, wherein a metadata region including positional information of the object sound source includes the position correction information.

11. The reception device according to claim 9, wherein a user data region includes the position correction information.

12. The reception device according to claim 7, wherein a layer of the second video stream includes the position correction information.

13. The reception device according to claim 7, wherein a layer of the container includes the position correction information.

14. The reception device according to claim 13, wherein signaling information includes the position correction information.

15. The reception device according to claim 14, wherein the container is a video transport stream, and
a video elementary stream loop corresponding to the second video stream of a program map table includes the position correction information.

16. A reception method comprising:
receiving a container including a first video stream having video data of a first view of a first camera, a second video stream having video data of a second view of a second camera, an audio stream having audio data of an object sound source, the audio data being captured at a position of the first camera and corresponding to the first view of the object sound source, and position correction information including difference components indicating a difference between a position and an orientation of the second view with respect to the first view, which corresponds to the position of the first camera at which the audio data was captured; and
transforming, in response to a selection of the second view, the audio data of the object sound source based on the position correction information included in the container by applying the difference components of the position correction information to the audio stream in order to modify correspondence of the audio data from the position of the first camera to a position of the second camera.

17. The reception method according to claim 16, further comprising:
obtaining the video data of the first view, the video data of the second view, the audio data and positional information of the object sound source from the first video stream, the second video stream, and the audio stream,
selectively outputting the video data of the first view or the video data of the second view,
mapping the audio data of the object sound source to any speaker position on the basis of the positional information of the object sound source, and
correcting the positional information on the basis of the position correction information in such a way that the positional information is based on the second view, when the video data of the second view is selectively output.

18. The reception method according to claim 16, wherein a layer of the audio stream includes the position correction information.

19. The reception method according to claim 16, wherein a layer of the second video stream includes the position correction information.

20. The reception method according to claim 16, wherein a layer of the container includes the position correction information.

* * * * *